US012361413B2

(12) United States Patent
Sano et al.

(10) Patent No.: US 12,361,413 B2
(45) Date of Patent: Jul. 15, 2025

(54) INTERACTIVE RESPONSIVE AI DEVICES AND METHODS

(71) Applicants: Louise Dorothy Saulog Sano, Sheridan, WY (US); Manuel Issac Sano, Sheridan, WY (US)

(72) Inventors: Louise Dorothy Saulog Sano, Sheridan, WY (US); Manuel Issac Sano, Sheridan, WY (US)

( * ) Notice: Subject to any disclaimer, the term of this patent is extended or adjusted under 35 U.S.C. 154(b) by 0 days.

(21) Appl. No.: 18/440,487

(22) Filed: Feb. 13, 2024

(65) Prior Publication Data

US 2024/0428236 A1    Dec. 26, 2024

Related U.S. Application Data

(63) Continuation-in-part of application No. 17/532,991, filed on Nov. 22, 2021, now Pat. No. 11,900,369, (Continued)

(51) Int. Cl.
*G06Q 30/02*    (2023.01)
*G06Q 20/10*    (2012.01)
(Continued)

(52) U.S. Cl.
CPC .......... *G06Q 20/384* (2020.05); *G06Q 20/10* (2013.01); *G06Q 20/123* (2013.01); *G06Q 30/0251* (2013.01); *G06T 19/006* (2013.01); *H04L 9/0643* (2013.01); *H04L 63/302* (2013.01); *H04L 63/306* (2013.01); *G06Q 2220/00* (2013.01); *H04L 9/50* (2022.05); *H04L 2209/56* (2013.01)

(58) Field of Classification Search
CPC .... G06Q 20/384; G06Q 20/10; G06Q 20/123; G06Q 2220/00; G06Q 30/0207–30/0277; G06T 19/006; H04L 9/0643; H04L 63/302; H04L 63/306; H04L 9/50; H04L 2209/56

See application file for complete search history.

(56) References Cited

U.S. PATENT DOCUMENTS

| | | | | |
|---|---|---|---|---|
| 6,314,401 | B1 * | 11/2001 | Abbe | ...................... G10L 17/00 704/272 |
| 10,771,524 | B1 * | 9/2020 | Long | ..................... H04L 67/104 |

(Continued)

*Primary Examiner* — Thuy N Nguyen
(74) *Attorney, Agent, or Firm* — Edmond DeFrank

(57) ABSTRACT

The embodiments disclose a an interactive system for creating personalized advertisements, including a client application having a profile manager module configured to gather personalized preference information about each plural audience user, wherein the personalized preference information includes images, spoken language, facial expressions, detected emotions, nonverbal cues, demographics, online queries, and browser history of each audience user, an interactive admin application operating configured to allow a creator user to generate advertisements and social media communications content and a template with a main message of the advertisement, wherein the responsive artificial intelligence processor is configured to learn and compare the personalized preference information of each audience user to known analytics for automatically determining an appropriate audience user of the advertisements and social media communications content as personalized content.

20 Claims, 34 Drawing Sheets

Related U.S. Application Data which is a continuation of application No. 16/879,566, filed on May 20, 2020, now Pat. No. 11,188,902.

(51) Int. Cl.
*G06Q 20/12* (2012.01)
*G06Q 20/38* (2012.01)
*G06Q 30/0251* (2023.01)
*G06T 19/00* (2011.01)
*H04L 9/06* (2006.01)
*H04L 9/40* (2022.01)
*H04L 9/00* (2022.01)

(56) References Cited

U.S. PATENT DOCUMENTS

| | | | | |
|---|---|---|---|---|
| 2008/0004952 A1* | 1/2008 | Koli | | G06Q 30/0267 |
| | | | | 705/14.55 |
| 2009/0164275 A1* | 6/2009 | Chen | | G06Q 30/02 |
| | | | | 705/14.19 |
| 2013/0143669 A1* | 6/2013 | Muller | | A63F 13/795 |
| | | | | 463/42 |
| 2013/0191278 A1* | 7/2013 | O'Leary | | G06Q 20/10 |
| | | | | 705/39 |
| 2013/0275210 A1* | 10/2013 | Johnson | | G06Q 30/0277 |
| | | | | 705/14.48 |
| 2014/0380446 A1* | 12/2014 | Niu | | H04W 12/06 |
| | | | | 726/7 |
| 2015/0006273 A1* | 1/2015 | Scipioni | | G06Q 30/0224 |
| | | | | 705/14.25 |
| 2015/0039462 A1* | 2/2015 | Shastry | | G06Q 30/0631 |
| | | | | 705/26.81 |
| 2016/0350782 A1* | 12/2016 | Wang | | G06Q 20/387 |
| 2018/0280806 A1* | 10/2018 | Otomo | | A63F 13/35 |
| 2018/0365580 A1* | 12/2018 | Musuvathi | | G06N 20/00 |
| 2019/0005359 A1* | 1/2019 | Wilf | | G06F 18/2413 |
| 2019/0262721 A1* | 8/2019 | MacInnes | | G07F 17/323 |
| 2020/0112759 A1* | 4/2020 | Alameh | | H04N 21/42202 |
| 2021/0125608 A1* | 4/2021 | Weir | | G10L 15/22 |
| 2021/0224346 A1* | 7/2021 | Peng | | G06F 40/30 |
| 2021/0256512 A1* | 8/2021 | Mabrouki | | G06Q 20/363 |
| 2021/0304122 A1* | 9/2021 | Dattamajumdar | | G16H 40/20 |
| 2022/0309543 A1* | 9/2022 | Kushner | | G06Q 30/0276 |

* cited by examiner

INTERACTIVE RESPONSIVE AI DEVICES AND METHODS

CROSS-REFERENCE TO RELATED APPLICATIONS

This Patent Application is a Continuation-in-part and claims priority to the United States Patent Applications entitled: "LIVE TIME CONNECTION APPLICATION METHOD AND DEVICES", U.S. Ser. No. 17/532,991 filed Nov. 22, 2021, by Louise Dorothy Saulog Sano, which is a Continuation of United States Patent Applications entitled: "LIVE TIME CONNECTION APPLICATION METHOD AND DEVICES", U.S. Ser. No. 16/879,566 filed May 20, 2020, U.S. Pat. No. 11,188,902, Issued on Nov. 30, 2021 by Louise Dorothy Saulog Sano, all of which are incorporated herein by reference.

BACKGROUND

Today's population is spending a lot of their time and money using applications to access the internet for buying products and social interaction. Applications are used for person-to-person communications, group chats, and other activities. Some of the applications being used are free and others must be paid for by the consumer. What is needed is a method where the consumer is paid for all the time spent using the application.

DETAILED DESCRIPTION OF THE INVENTION

In the following description, reference is made to the accompanying drawings, which form a part hereof, and which are shown by way of illustration a specific example in which the invention may be practiced. It is to be understood that other embodiments may be utilized and structural changes may be made without departing from the scope of the present invention.

General Overview

It should be noted that the descriptions that follow, for example, in terms of a live time connection application method and devices are described for illustrative purposes and the underlying system can apply to any number and multiple types of user on-line purposes. In one embodiment of the present invention, the live time connection application method and devices can be configured using different forms of digitally produced reality. The live time connection application method and devices can be configured to include users earning cryptocurrency for time using the application and can be configured to include users buying advertisers' products with their earned cryptocurrency using the present invention.

The phrase "live time" and "live time" in singular and plural are interchangeable with the terms and phrases live connection, interactive live connection, real-time and other phrases associated with real-time and live wireless, online and wired interactive communications between parties or entities via any mobile or non-mobile communication devices including holograms and augmented reality, virtual reality and mixed reality, without any change in meaning. In addition, the phrase "mobile device" in singular and plural is interchangeable with the terms and phrases smartphones, mobile phones, websites, game consoles, television, and other communication devices including holograms and augmented reality without any change in meaning. It should be noted that numerous real world working examples are described below in detail with reference to their associated figures for illustrative purposes only.

Figure 1:
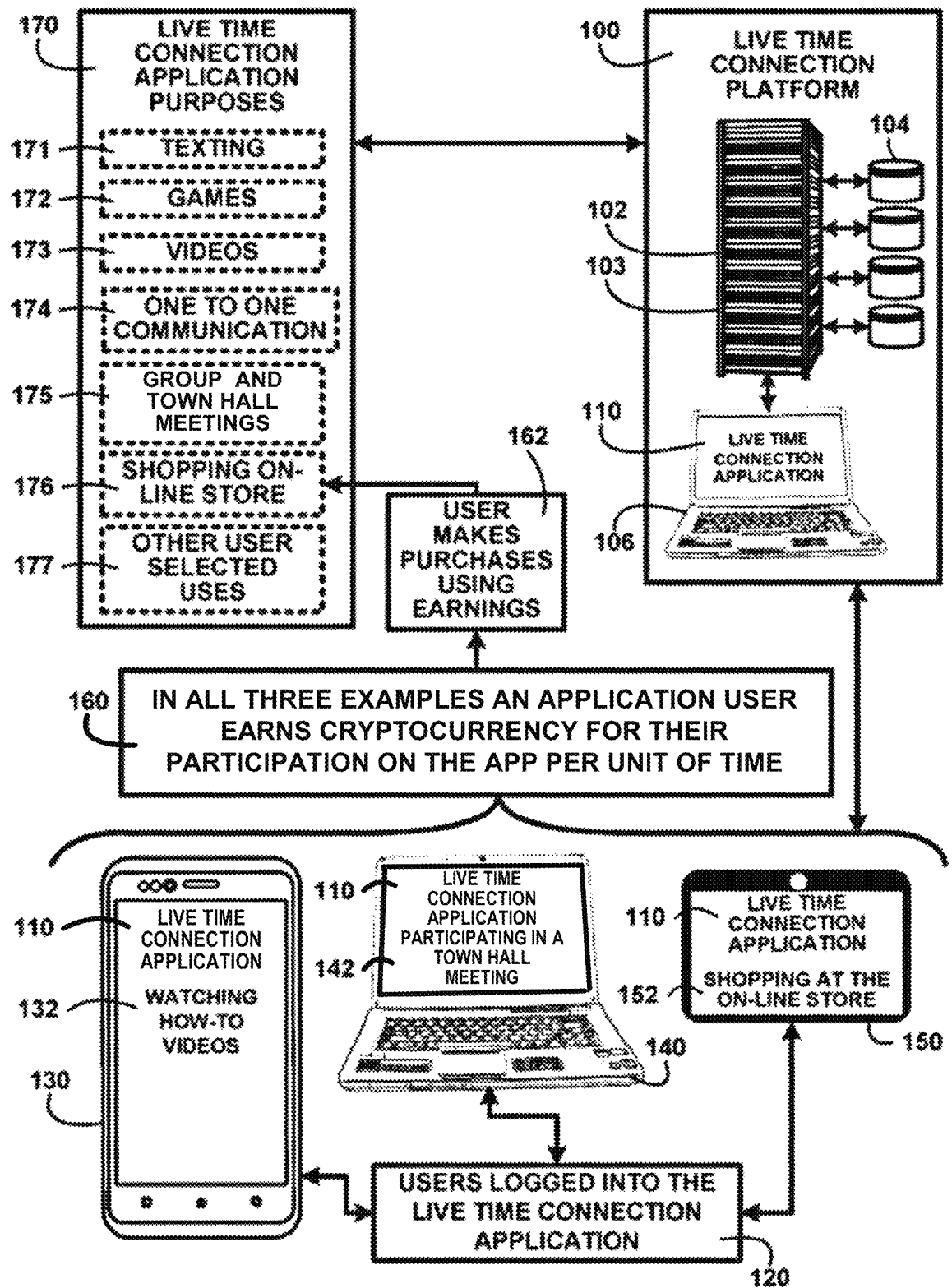
FIG. 1 shows for illustrative purposes only an example of an overview of the live-time connection application method and devices of one embodiment.

FIG. 1 shows for illustrative purposes only an example of an overview of the live-time connection application method and devices of one embodiment. FIG. 1 shows a live-time connection platform 100 with at least one digital server 102, live time connection website 103, a plurality of databases 104, and live time connection platform computer 106 with a live-time connection application 110 installed.

Users logged into the live time connection application 120 include one user on a user phone 130 with the live time connection application 110 watching how-to videos 132. In another instance, a user is logged in on their user laptop computer 140 with the live time connection application 110 participating in a town hall meeting 142. A user tablet 150 with the live time connection application 110 is used for shopping at the online store 152. In all three examples, an application user earns cryptocurrency for their participation in the app per unit of time 160. A user makes purchases using earnings 162 shopping online store 176, one of the live time connection application purposes 170. Other purposes include texting 171, games 172, videos 173, one-to-one communication 174, group and town hall meetings 175, and other user-selected uses 177 of one embodiment.

Figure 2:
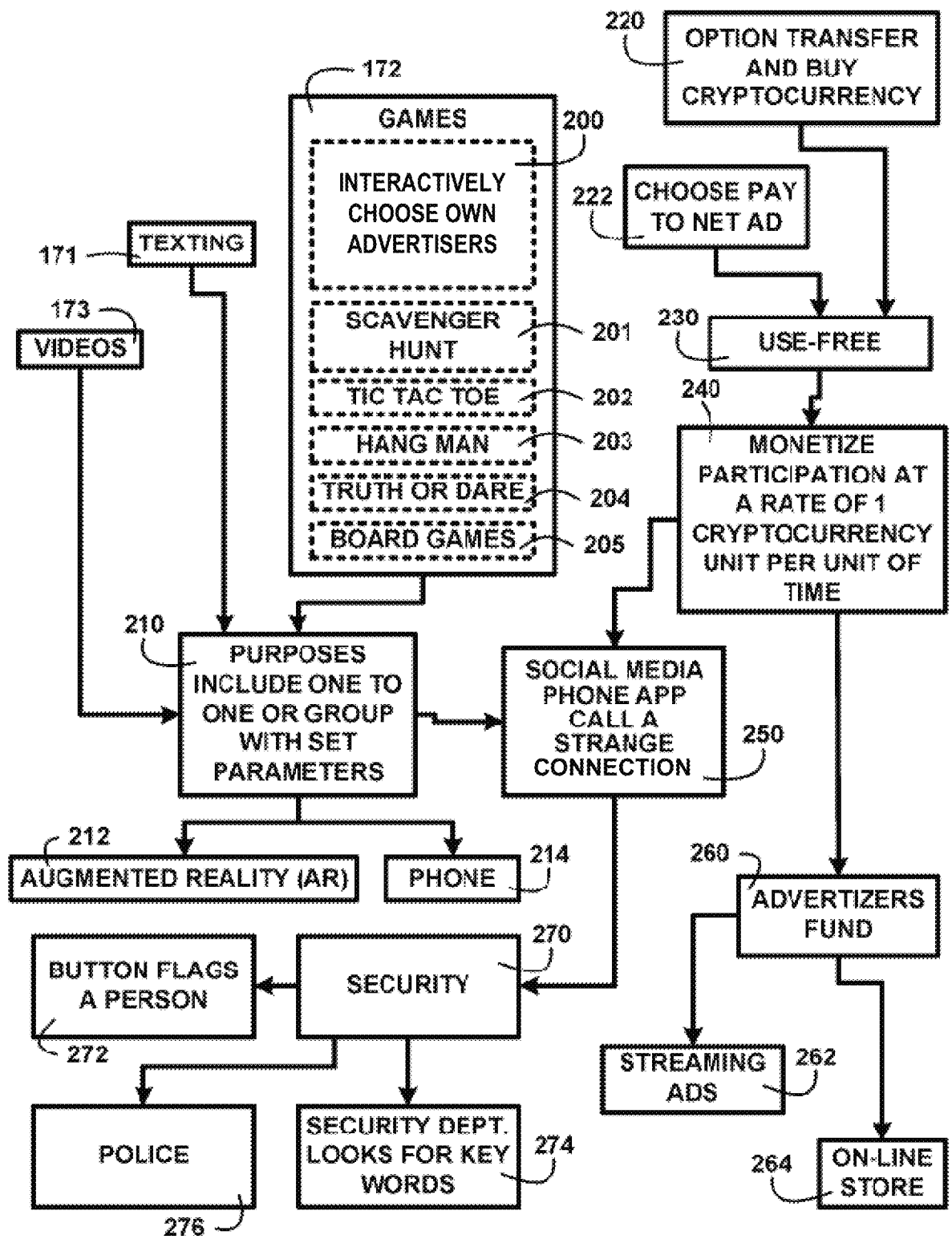
FIG. 2 shows a block diagram of an overview of a method to monetize participation of one embodiment.

FIG. 2 shows a block diagram of an overview of a method to monetize participation of one embodiment. FIG. 2 shows live time connection application purposes 170 of FIG. 1 including games 172. A user can employ a feature to interactively choose their own advertisers 200, wherein the advertisers can display, for example, advertisement banners during gameplay. Games include, for example, Scavenger Hunt 201, Tic Tac Toe 202, hangman 203, truth or dare 204, and board games 205. The live time connection application purposes 170 of FIG. 1 include texting 171 and other purposes include videos 173. Purposes include one-to-one or group with set parameters 210 interactions. These interactions include augmented reality 212 and phone 214 settings.

A user can option, transfer, and buy cryptocurrency 220. An advertiser can choose to pay to net advertisement 222. The users use 230 the live time connection application 110 of FIG. 1. The time connection application method and devices are configured to monetize participation at a rate of 1 cryptocurrency unit per unit of time 240 for the users. Advertisers pay into an advertiser's fund 260 for streaming advertisements 262 and online store 264 participations.

Users when finding a social media phone app call the user considers a strange connection 250 and can notify security 270. The security department is looking for keywords 274 from the reported connection. The security department can activate a button flagging a person 272 and/or contacting the police 276 based on their assessment of the situation and circumstances. The security department looks for keywords 274 and also tracks connection traffic to determine if a user is violating any laws or using the connection for illicit purposes, breaking the law, terrorism, bullying, stalking, identity theft, or any other unacceptable behavior. The security department will report to the police or appropriate law enforcement agency any user who is suspected of violating the law. For unacceptable behavior that may not have reached an unlawful level the security department can send the user an initial cease of the activity and if the user's connection is detected as using the offending keywords or is reported can block the user from the system of one embodiment.

Figure 3A:
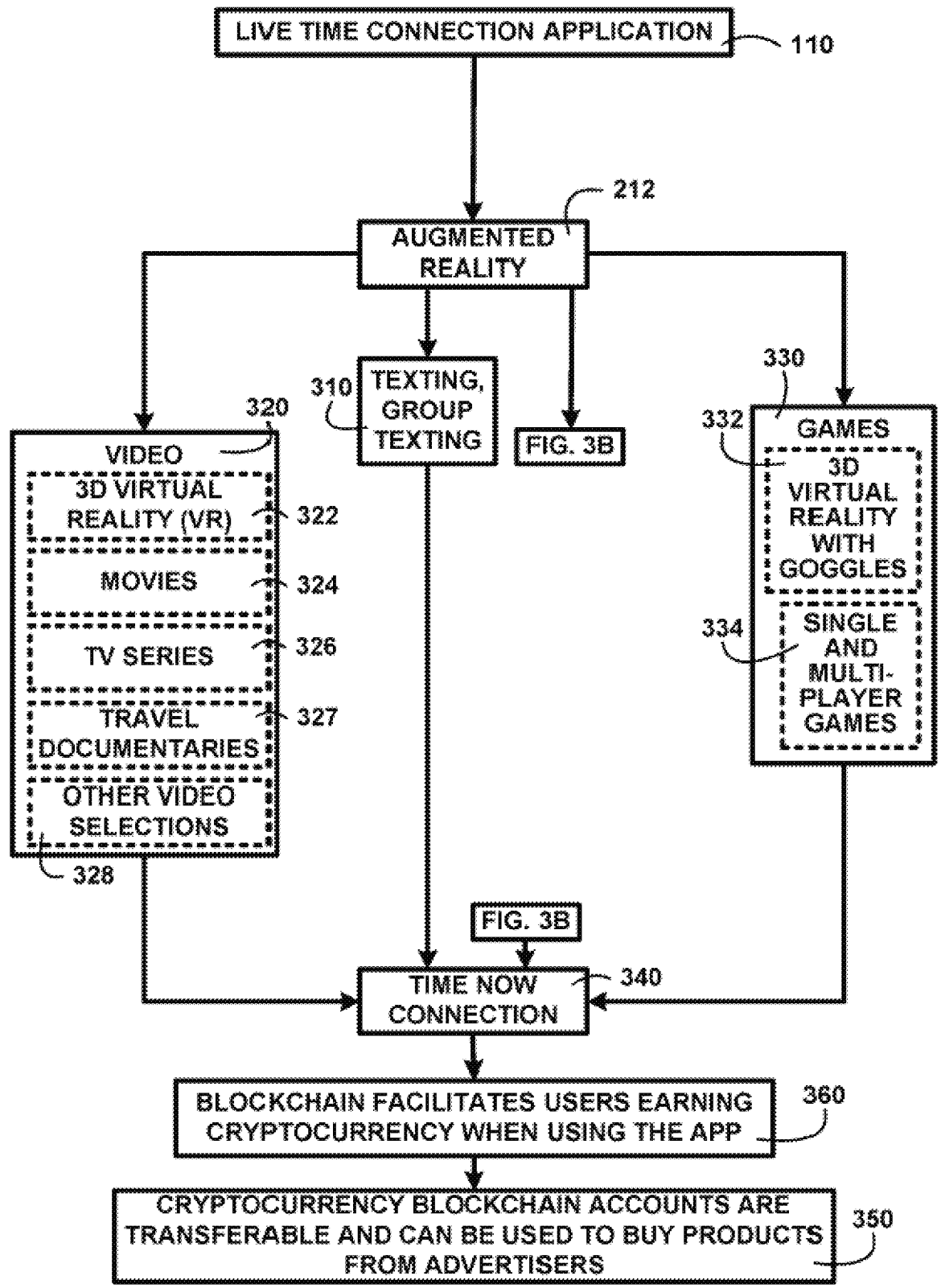
FIG. 3A shows a block diagram of an overview of the live-time connection application of one embodiment.

FIG. 3A shows a block diagram of an overview of the live-time connection application of one embodiment. FIG. 3A shows the live time connection application 110 in one embodiment creating an augmented reality 212 for the user. The live time connection application 110 users can use a video 320 feature for viewing and participating in 3D virtual reality 322, movies 324, TV series 326, travel documentaries 327, and other video selections 328. The live time connection application 110 provides features for texting, and group texting 310. Another feature is games 330 including 3D virtual reality with goggles 332 and single and multi-player games 334. Additional forms of interaction are described in FIG. 3B. A time now connection 340 is used to track user time using the application while the user earns cryptocurrency for their time using the application. Blockchain facilitates users earning cryptocurrency when using the app 360. Cryptocurrency blockchain accounts are transferable and can be used to buy products from advertisers 350 of one embodiment.

Figure 3B:
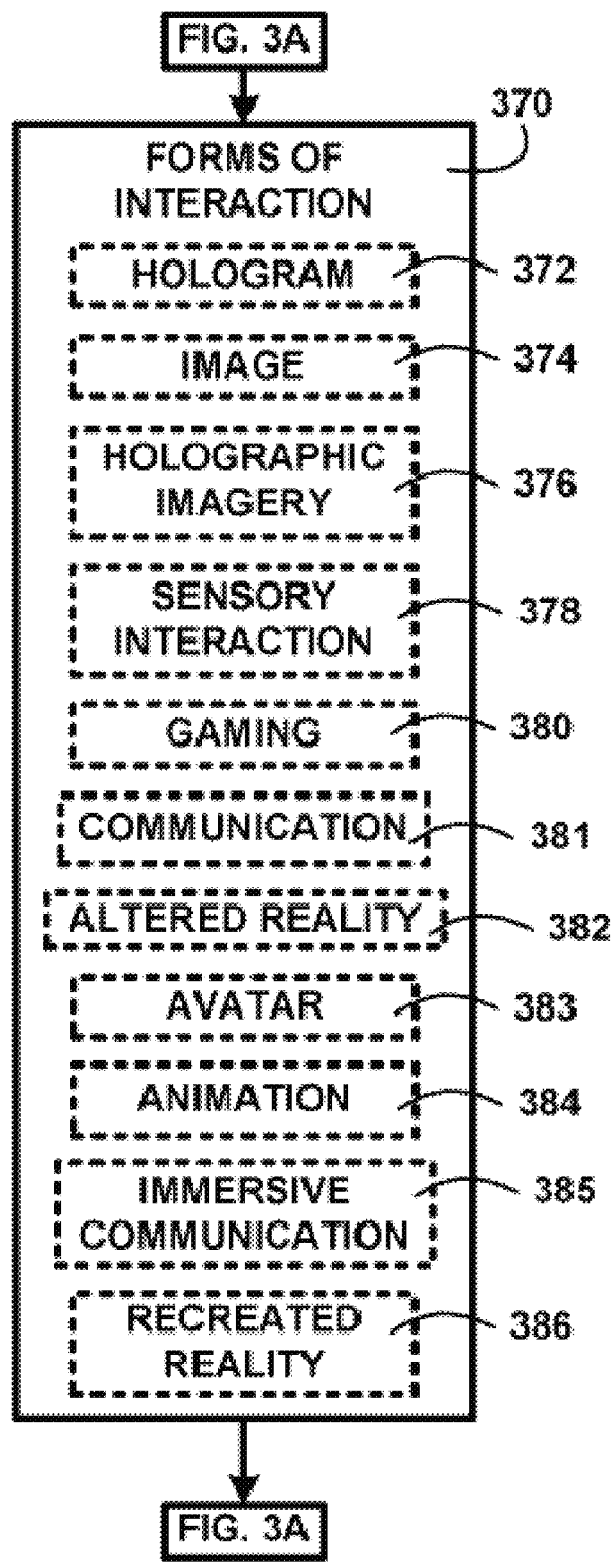
FIG. 3B shows a block diagram of an overview of forms of interaction of one embodiment.

FIG. 3B shows a block diagram of an overview of forms of interaction of one embodiment. FIG. 3B shows a continuation from FIG. 3A, showing additional forms of interaction 370 when using the live time connection application 110 of FIG. 1. The additional forms of interaction 370 include hologram 372, image 374, holographic imagery 376, sensory interaction 378, gaming 380, communication 381, altered reality 382, avatar 383, animation 384, immersive communication 385, and recreated reality 386 and returning to FIG. 3A for additional processes of one embodiment.

Figure 4:
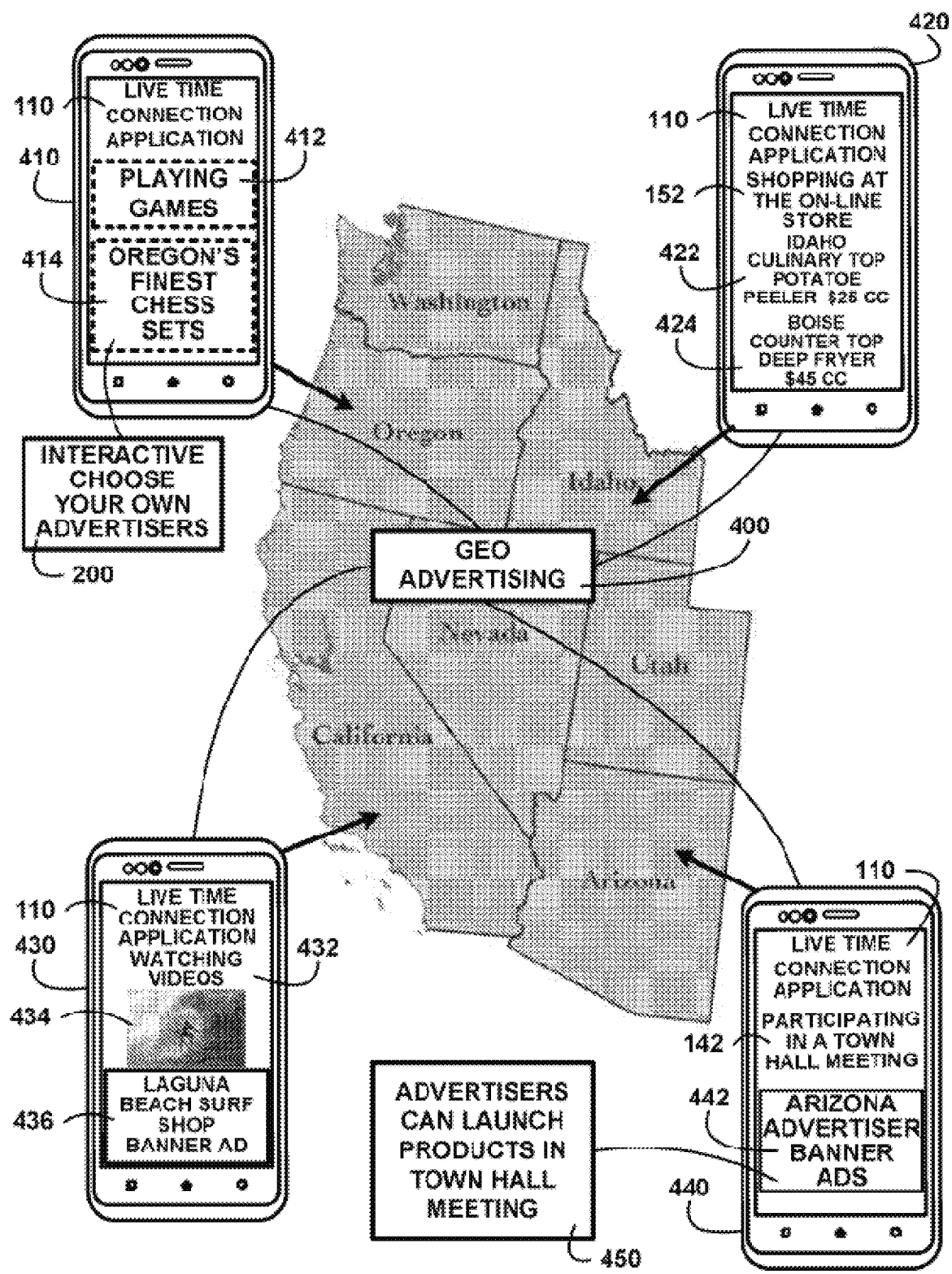
FIG. 4 shows for illustrative purposes only an example of geo advertising of one embodiment.

FIG. 4 shows for illustrative purposes only an example of geographic advertising of one embodiment. FIG. 4 shows one benefit of the live time connection application 110 is the interactive choose the own advertisers 200 feature. In one example, geographic advertising 400 is being used on an Oregon user phone 410 with the live time connection application 110 for playing games 412. The Oregon user phone 410 displays Oregon's finest chess sets 414 chosen by the Oregon user of one embodiment.

In another example, an Idaho user phone 420 with the live time connection application 110 shows the user shopping at the online store 152. The user has chosen advertisers including Idaho culinary top potato peeler $25 cc 422 and Boise countertop deep fryer $45 cc 424 where "cc" means cryptocurrency of one embodiment.

A California user phone 430 with the live time connection application 110 is used for watching video 432, for example, a surfing video 434. The California user phone 430 is displaying a chosen advertiser Laguna Beach Surf Shop banner ad 436 of one embodiment.

FIG. 4 also shows an Arizona user phone 440 with the live time connection application 110 installed. The user is participating in a town hall meeting 142. The user's phone is displaying Arizona advertiser banner advertisements 442. The organizers of a town hall meeting can make arrangements where advertisers can launch products in a town hall meeting 450 of one embodiment.

Figure 5:
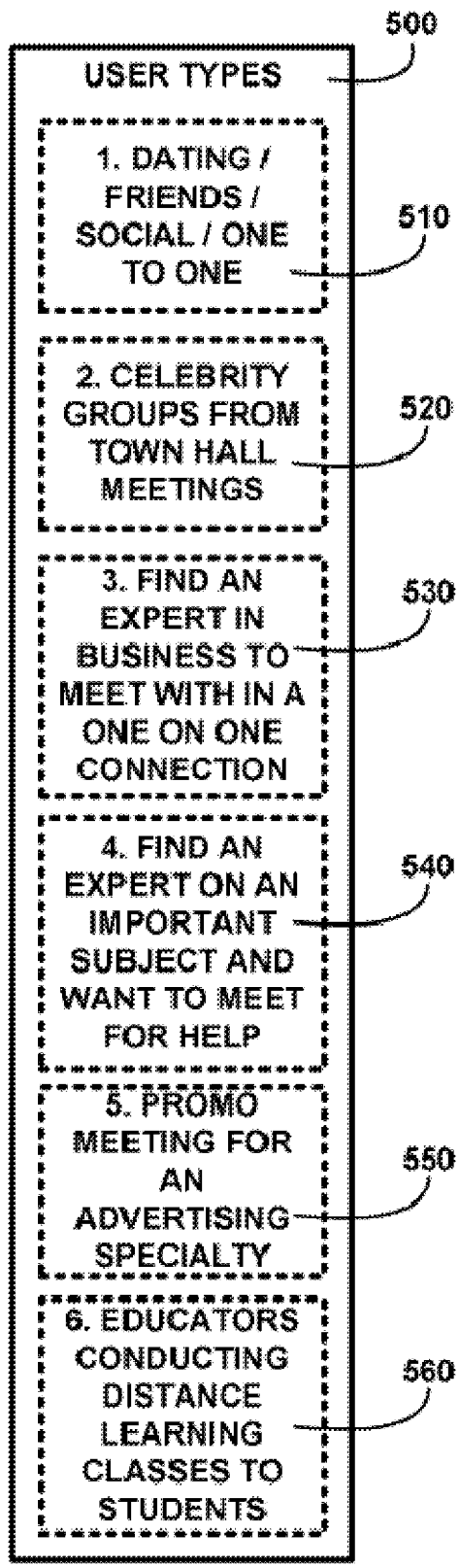
FIG. 5 shows a block diagram of an overview of user types of one embodiment.

FIG. 5 shows a block diagram of an overview of user types of one embodiment. FIG. 5 shows examples of user types 500 who use the live time connection application 110 of FIG. 1 including 1. Dating/friends/social/one-to-one 510; 2. Celebrity groups from town hall meetings 520; 3. Users wanting to 3. find a business expert to meet with a one-on-one connection 530; 4. Users wanting to find an expert in an important subject and want to meet for help 540; and 5. Promo meeting for advertising specialty 550 6. Educators conducting distance learning classes to students 560 of one embodiment.

Figure 6:
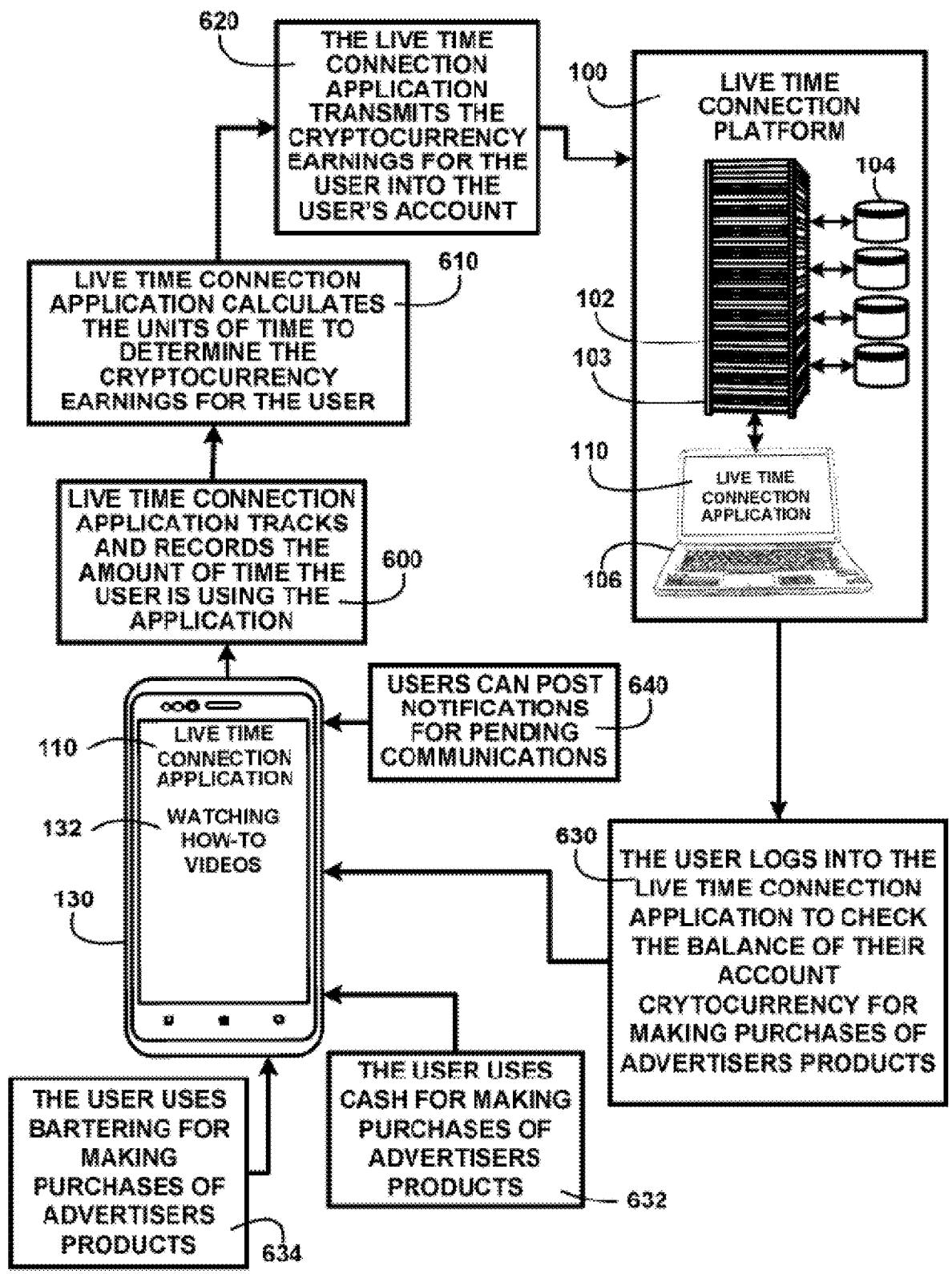
FIG. 6 shows for illustrative purposes only an example of cryptocurrency for making purchases of advertiser's products of one embodiment.

FIG. 6 shows for illustrative purposes only an example of cryptocurrency for making purchases of advertiser's products of one embodiment. FIG. 6 shows the live time connection platform 100 with at least one digital server 102, the live time connection website 103, a plurality of databases 104, and the live time connection platform computer 106 with the live time connection application 110. The user logs into the live time connection application to check the balance of their account cryptocurrency for making purchases of advertiser's products 630. The user uses cash for making purchases of advertiser's products 632. The user uses bartering for making purchases of advertiser's products 634. Users earning cryptocurrency include the initiator of the contact as well as the listener/receiver/audience/participant. Users can post notifications for pending communications 640. Examples of notifications for pending communications include "The president is holding a State of the Union address Wed, at 3 pm", "Yoga instructor calling all fitness buffs Thur. at 2 pm", and "Famous actor will be holding a town hall for his followers/fans/friends in 10 minutes!". Users may pay to post notifications using cryptocurrency, fiat money, points, or credit. Users can purchase additional currency using other forms of currency such as bitcoin, fiat money, credit, and points.

The user phone 130 with the live time connection application 110 is used for watching how-to videos 132. The live time connection application tracks and records the amount of time the user is using the application 600. The live time connection application calculates the units of time to determine the cryptocurrency earnings for the user 610. The live time connection application transmits the cryptocurrency earnings for the user into the user's account 620 stored on the live time connection platform 100 of one embodiment.

Figure 7:
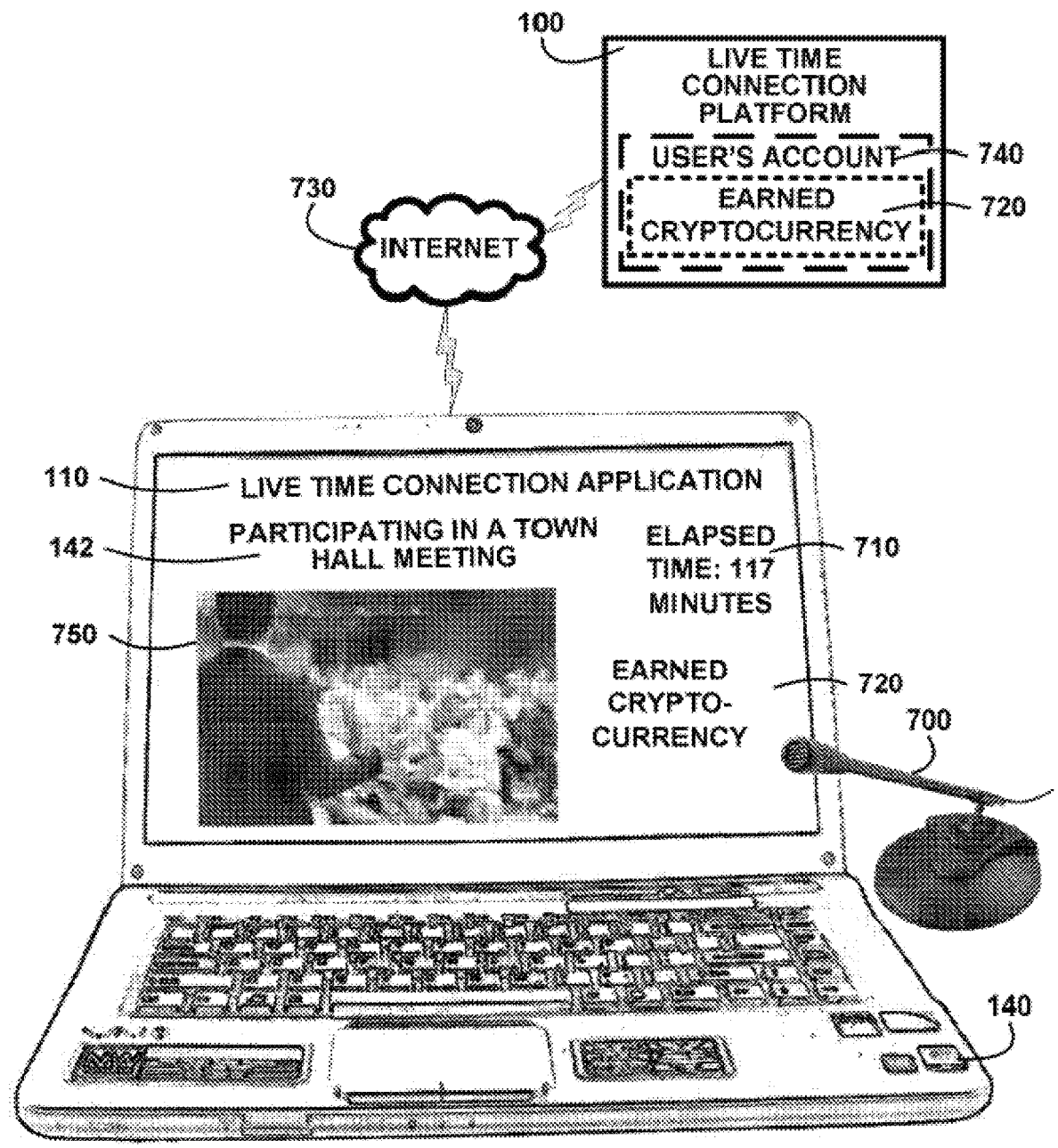
FIG. 7 shows a block diagram of an overview of participating in a town hall meeting of one embodiment.

FIG. 7 shows for illustrative purposes only an example of participating in a town hall meeting of one embodiment. FIG. 7 shows the user's laptop computer 140 with the live time connection application 110 for participating in a town hall meeting 142. The town hall meeting broadcast displayed 750 on the user's laptop computer 140 and a user's microphone for making comments in the town hall meeting 700. The live time connection application 110 tracks the elapsed time: 117 minutes 710 used for calculating earned cryptocurrency 720. The live time connection application transmits the user's elapsed time and earned cryptocurrency over the internet 730 to the live time connection platform 100 for recording into the user account 740 the user's earned cryptocurrency 720. Users earning cryptocurrency include the initiator of the contact as well as the listener/receiver/audience/connected participant of one embodiment.

Figure 8:
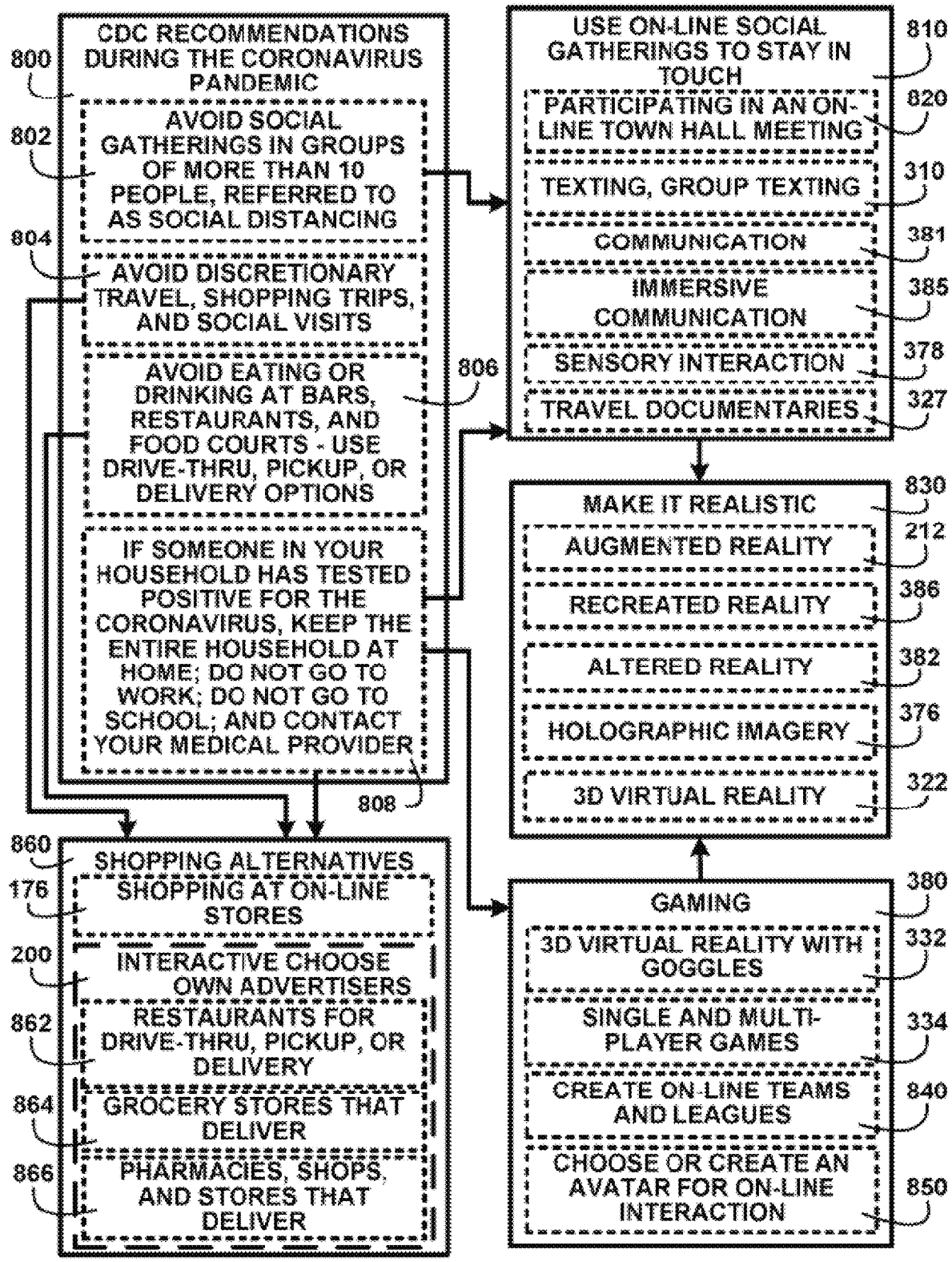
FIG. 8 shows for illustrative purposes only an example of the social distancing of one embodiment.

FIG. 8 shows a block diagram of an overview of social distancing of one embodiment. FIG. 8 shows CDC recommendations during the coronavirus pandemic 800 that include avoiding social gatherings in groups of more than 10 people, referred to as social distancing 802. Also avoid discretionary travel, shopping trips, and social visits 804 and avoid eating or drinking at bars, restaurants, and food courts—use drive-thru, pickup, or delivery options 806. If someone in your household has tested positive for the coronavirus, keep the entire household at home; do not go to work; do not go to school, and contact your medical provider 808.

One way to avoid social gatherings in groups of more than 10 people, referred to as social distancing 802 is to use online social gatherings to stay in touch 810. The live time connection application 110 of FIG. 1 provides the method of participating in an online town hall meeting 820, texting, group texting 310, communication 381, immersive communication 385, sensory interaction 378, and travel documentaries 327. The live time connection application 110 of FIG. 1 provides a way for a user, friends, and family to earn cryptocurrency while enjoying online social gatherings.

To avoid discretionary travel, shopping trips, and social visits 804 the live time connection application 110 of FIG. 1 lets a user experience online travel, shopping trips, and social visits and make it realistic 830. The live time connection application 110 of FIG. 1 uses augmented reality 212, recreated reality 386, altered reality 382, holographic imagery 376, and 3D virtual reality 322 to put the user and their friends and family into the experience.

The live time connection application 110 of FIG. 1 provides shopping alternatives 860. A user can spend their earned cryptocurrency for shopping on online store 176. The user can interactively choose their own advertisers 200 including restaurants for drive-thru, pickup, or delivery 862, grocery stores that deliver 864, and pharmacies, shops, and stores that deliver 866.

The live time connection application 110 of FIG. 1 will help the members of the user's household stay occupied and have fun using the gaming 380 alternative while earning more cryptocurrency. Gaming 380 with 3D virtual reality goggles 332 will make it realistic 830. Gaming 380 for single and multi-player games 334 and create online teams and leagues 840 with neighbors and distant friends. Household members can choose or create an avatar for online interaction 850 of one embodiment.

Figure 9:
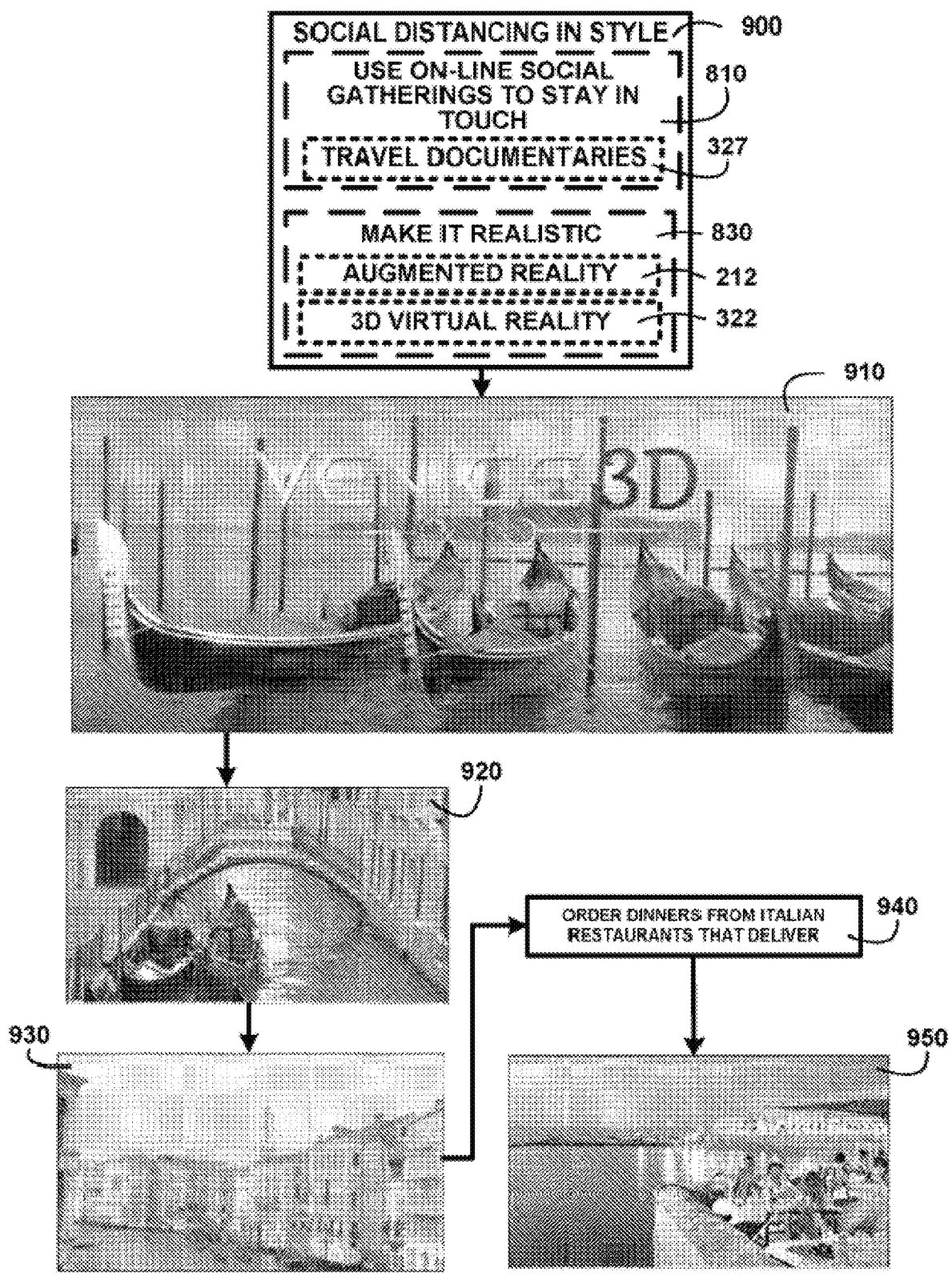
FIG. 9 shows for illustrative purposes only an example of social distancing in the style of one embodiment.

FIG. 9 shows for illustrative purposes only an example of social distancing in the style of one embodiment. FIG. 9 shows an example of social distancing in style 900. Social distancing in style 900 is one way to use online social gatherings to stay in touch 810. Invite your friends and family to join you at Travel Documentaries 327. Make it realistic 830 using augmented reality 212 and 3D virtual reality 322. Group view a 3D travel documentary, for example, Venice 3D 910 to tour the canals in a gondola 920. Cruise the waterways to view the centuries-old architecture 930 and add to the experience by ordering dinners from Italian restaurants that deliver 940. Virtually dine with your friends and family while enjoying the views of Venice 950. Social distancing in style creates a fun night-out experience, breaks the non-physical contact routine, and will help stimulate the economy, particularly for restaurants on one embodiment.

Figure 10:
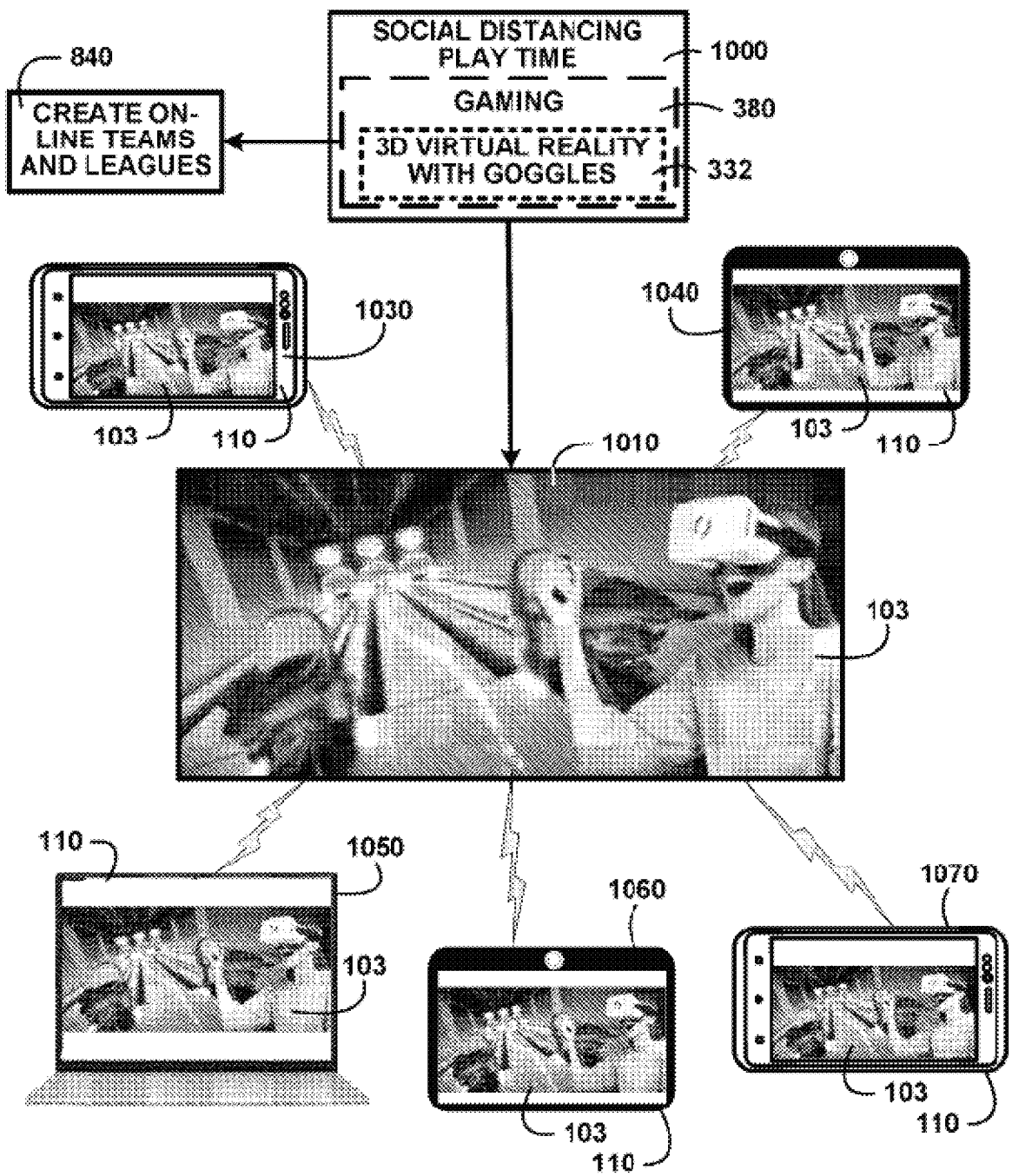
FIG. 10 shows for illustrative purposes only an example of social distancing play time of one embodiment.

FIG. 10 shows for illustrative purposes only an example of social distancing play time of one embodiment. FIG. 10 shows social distancing play time 1000 available through the live time connection application 110 gaming 380 alternative. The live time connection application 110 with 3D virtual reality with goggles 332 is used for example for playing a VR bowling program available from live time connection website 1010. Social distancing can be accomplished by creating online teams and leagues 840 among friends and family. The live time connection website 103 is, in this example, logged into by the first online player 1030, the second online player 1040, the third online player 1050, the fourth online player 1060, and the fifth online player 1070 for playing VR bowling of one embodiment.

Figure 11A:
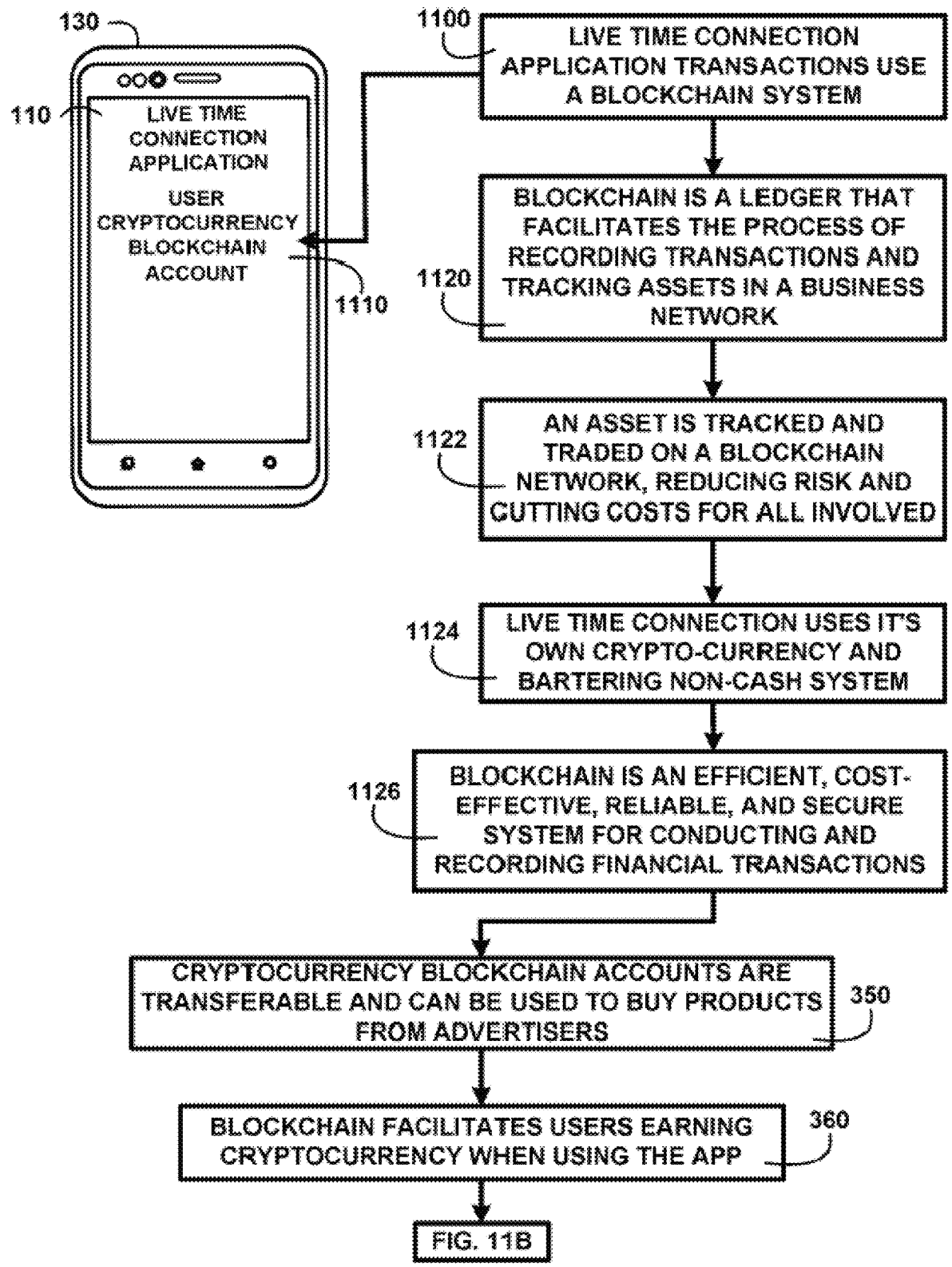
FIG. 11A shows for illustrative purposes only an example of crypto-currency and bartering non-cash system of one embodiment.

FIG. 11A shows for illustrative purposes only an example of crypto-currency and bartering non-cash system of one embodiment. FIG. 11A shows the live time connection application 110 installed on the user phone 130. Live time connection application transactions use a blockchain system 1100. The blockchain system creates a user cryptocurrency blockchain account 1110 to deposit and withdraw cryptocurrency earned by the user for the time spent using the live time connection application 110. Blockchain is a ledger that facilitates the process of recording transactions and tracking assets in a business network 1120. The use of cryptocurrency is not intended to replace money or circumvent federal mandates and taxation.

In the blockchain system, an asset is tracked and traded on a blockchain network, reducing risk, and cutting costs for all involved 1122. The live time connection uses its cryptocurrency and bartering non-cash system 1124 for paying users and for user purchases of advertiser's products. Blockchain is an efficient, cost-effective, reliable, and secure system for conducting and recording financial transactions 1126. For example, cryptocurrency blockchain accounts are transferable and can be used to buy products from advertisers 350. Blockchain facilitates users to earn cryptocurrency when using the app 360. Additional blockchain descriptions continue on FIG. 11B of one embodiment.

Figure 11B:
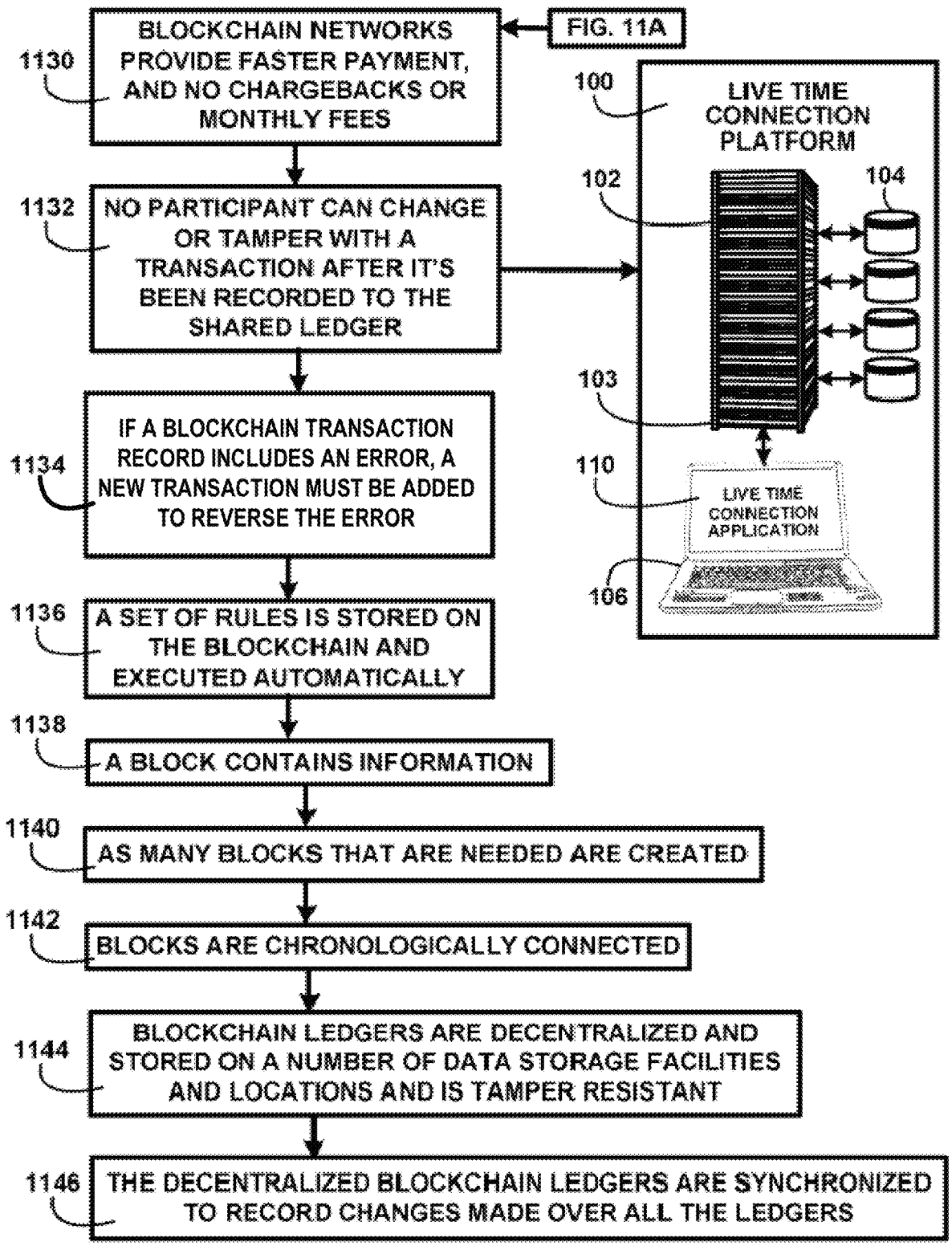
FIG. 11B shows for illustrative purposes only an example of blockchain transactions of one embodiment.

FIG. 11B shows for illustrative purposes only an example of blockchain transactions of one embodiment. FIG. 11B shows a continuation from FIG. 11A blockchain networks provide faster payment, and no chargebacks or monthly fees 1130. The transactions are safe as no participant can change or tamper with a transaction after it has been recorded to the shared ledger 1132. The live-time connection blockchain transactions are first recorded on the live-time connection platform 100. The live time connection platform 100 includes at least one digital server 102, a live time connection website 103, and a plurality of databases 104, a live time connection platform computer 106 with the live time connection application 110.

If a blockchain transaction record includes an error, a new transaction must be added to reverse the error 1134. A set of rules is stored on the blockchain and executed automatically 1136. A block contains information 1138 and a blockchain is made up of as many blocks that are needed are created 1140. The order of the block creation is maintained as blocks are chronologically connected 1142. Blockchain ledgers are decentralized and stored on several data storage facilities and locations and are tampered-resistant 1144. The decentralized blockchain ledgers are synchronized to record changes made to it over all the ledgers 1146 of one embodiment.

Figure 12A:
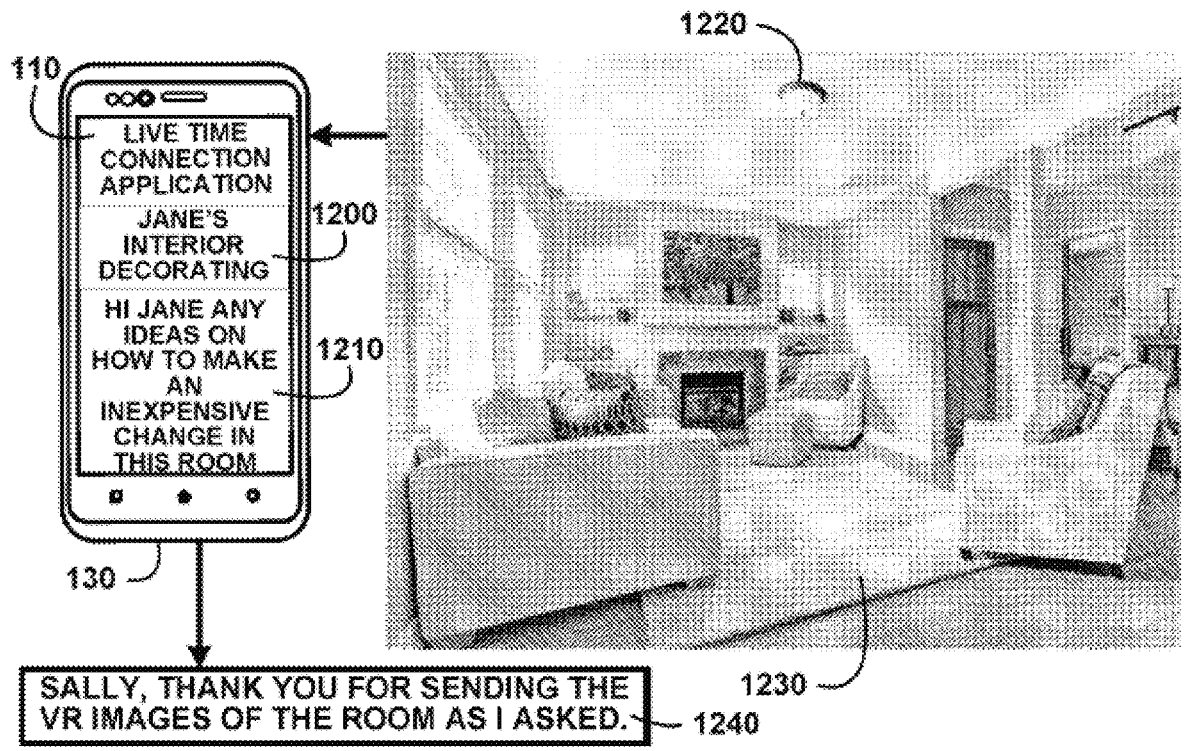
FIG. 12A shows for illustrative purposes only an example of conducting business transactions remotely of one embodiment.

FIG. 12A shows for illustrative purposes only an example of conducting business transactions remotely of one embodiment. FIG. 12A shows the live time connection application 110 on a user phone 130, in this example Jane's interior decorating 1200. Jane's Interior Decorating 1200 does business online outside its local area using augmented, virtual, and mixed reality. In this example, the customer is several states away. The customer writes "Hi Jane, any ideas on how to make an inexpensive change in this room?" 1210. The customer has sent a connection to VR images of a room with a ceiling light 1220. The VR images of the room include a view of the carpet 1230. Jane replies to the customer, "Sally, thank you for sending the VR images of the room as I asked." 1240 of one embodiment.

Figure 12B:
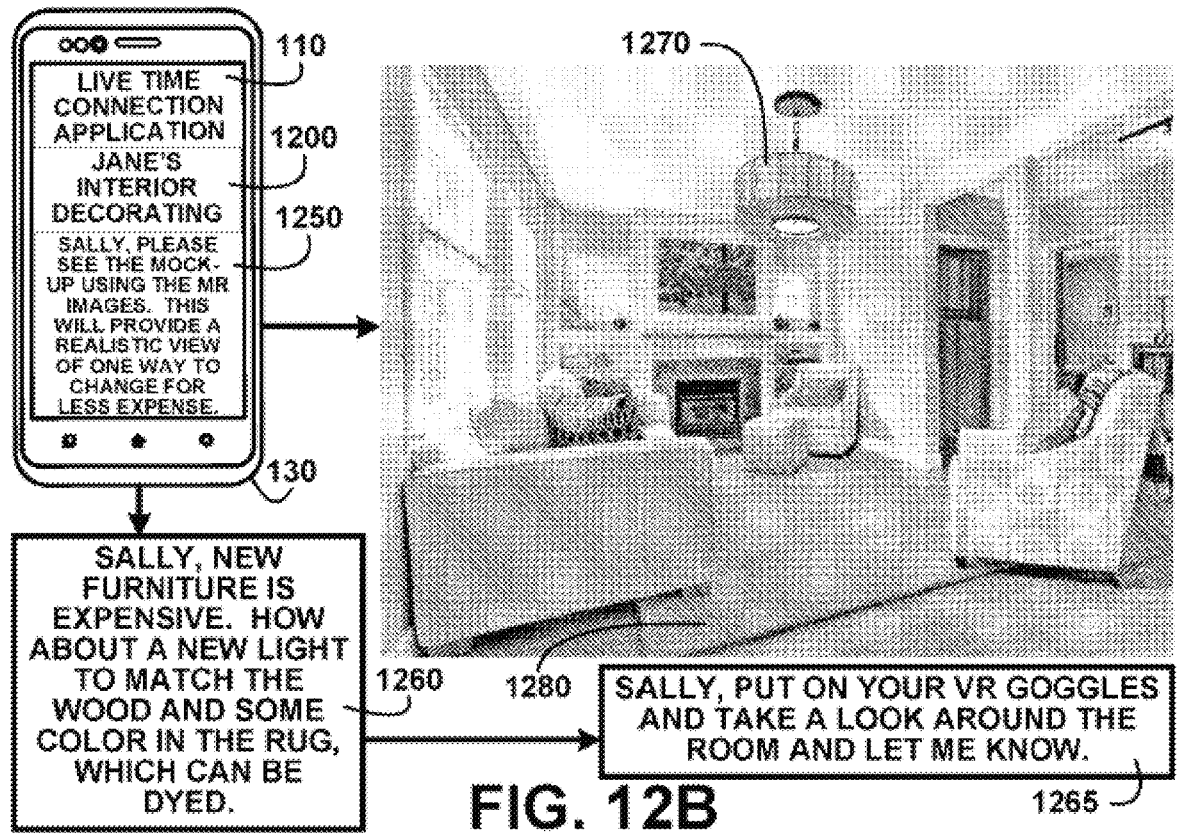
FIG. 12B shows for illustrative purposes only an example of virtual reality use for the business of one embodiment.

FIG. 12B shows for illustrative purposes only an example of virtual reality use for the business of one embodiment. FIG. 12B shows the live time connection application 110 on the user phone 130. Jane's interior decorating 1200 sent the customer a mixed reality image of the same room where the ceiling light has been changed and the carpet dyed a different color. Jane from Jane's Interior Decorating advises her customer, "Sally, please see the mock-up using the MR images. This will provide a realistic view of one way to change for less expense." 1250.

Jane further advises her customer, "Sally, new furniture is expensive. How about a new light to match the wood and some color in the rug, which can be dyed." 1260. The MR image of a proposed new ceiling light 1270 and the MR image of a proposed new carpet color 1280 are transmitted to the customer. Jane asks her customer, "Sally, put on your VR goggles take a look around the room, and let me know." 1265. Jane is successful in performing her interior decorating design work and will advise her customer where Jane can purchase the lamp with Jane's fee included and where the carpet can be dyed with a markup fee for Jane of one embodiment.

Figure 13:
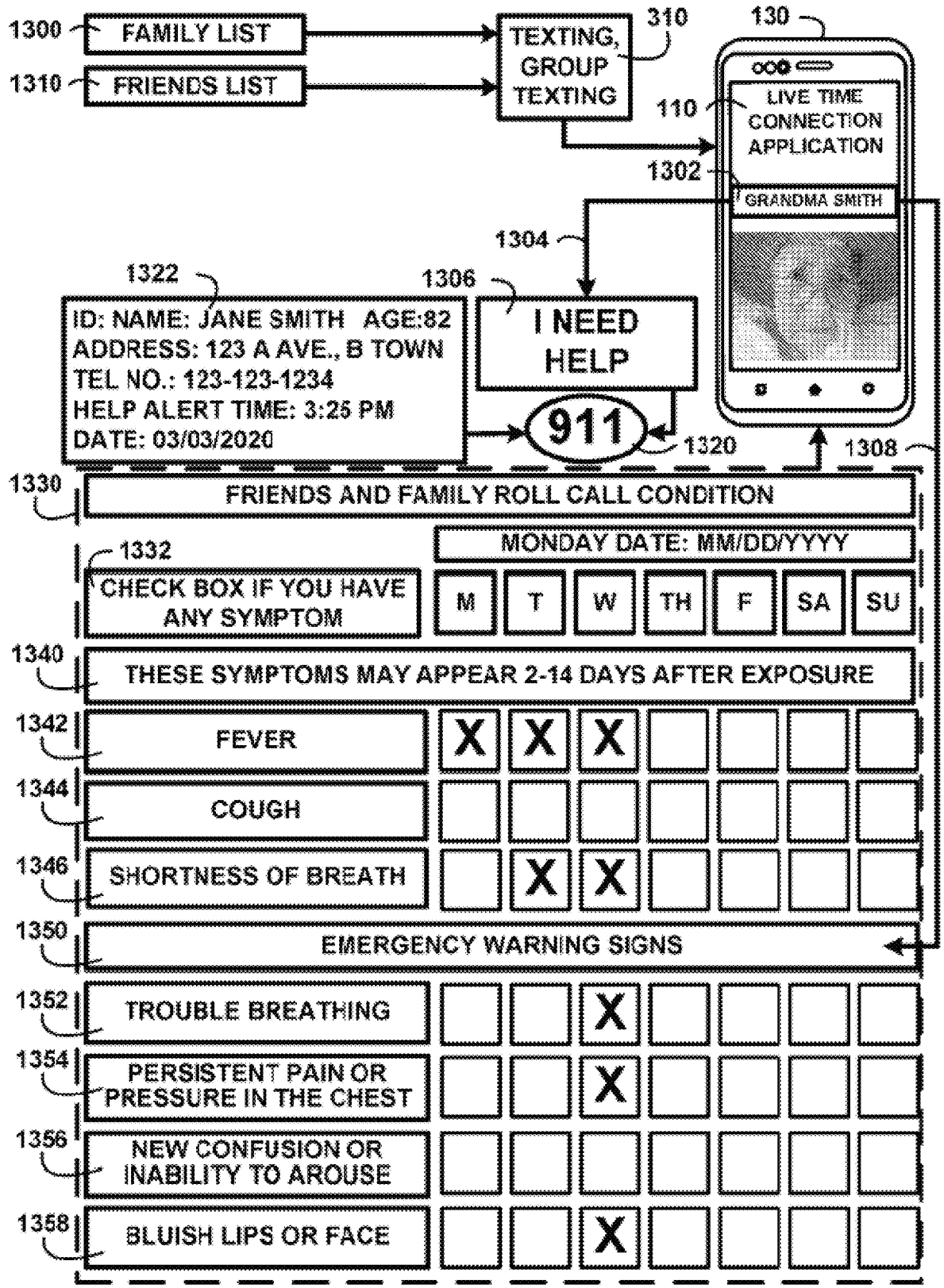
FIG. 13 shows for illustrative purposes only an example of friends and family roll call condition of one embodiment.

FIG. 13 shows for illustrative purposes only an example of friends and family roll call condition of one embodiment. FIG. 13 shows a family list 1300 and a friends list 1310 for contacts of the user to check on their health conditions during the COVID-19 pandemic. The two lists are set up for automatic texting, group texting 310 using the live time connection application 110 on the user phone 130. The text message sent out daily is part of a friends and family roll call condition 1330 to keep in close contact during the social distancing period. One of the people on the family list 1300 is Grandma Smith 1302. Grandma Smith 1302 is elderly and has other health conditions that put her in the high-risk group for infection of the coronavirus.

An audible alert and visual alert are produced by the live time connection application 110 on the user phone 130 when Grandma Smith's response to condition check text 1304 is "I need help" 1306. Grandma Smith had checked emergency warning signs 1308 from the list of CDC symptoms. The user's relative calls 911 1320. The user relative provides 911 with Grandma Smith's ID information and address from the records stored in the family list 1300 on the live time connection application 110. The stored information 1322 includes ID: Name: Jane Smith; Age: 82; Address: 123 A Ave., B Town; Tel no.: 123-123-1234. The user relative also provides 911 with the Help Alert Time: 3:25 μm and Date: Mar. 5, 2020. The VR image of Grandma Smith shows one of the emergency warning signs 1308 bluish lips or face 1358.

The past few days show the responses from Grandma Smith which indicate she started showing symptoms on Monday. Her responses to the friends and family roll call condition 1330 texting for the week of Monday date: Mar. 3, 2020 indicate her condition has become critical. The responses for the days of the week M, T, W, Th, F, Sa, and Su show her checks for the instruction to check box if you have any symptom 1332. It explains that these symptoms may appear 2-14 days after exposure 1340. For the fever 1342 symptom Grandma Smith had checked M, T, and W. She indicated no cough 1344, but for shortness of breath 1346 Grandma Smith had checked T and W. On Wednesday for the emergency warning signs 1350 Grandma Smith checked trouble breathing 1352, persistent pain or pressure in the chest 1354, no new confusion or inability to arouse 1356, but additionally bluish lips or face 1358. The live time connection application 110 features provided a cadre of tools to keep track of the condition of the user's family members and friends of one embodiment.

Figure 14:
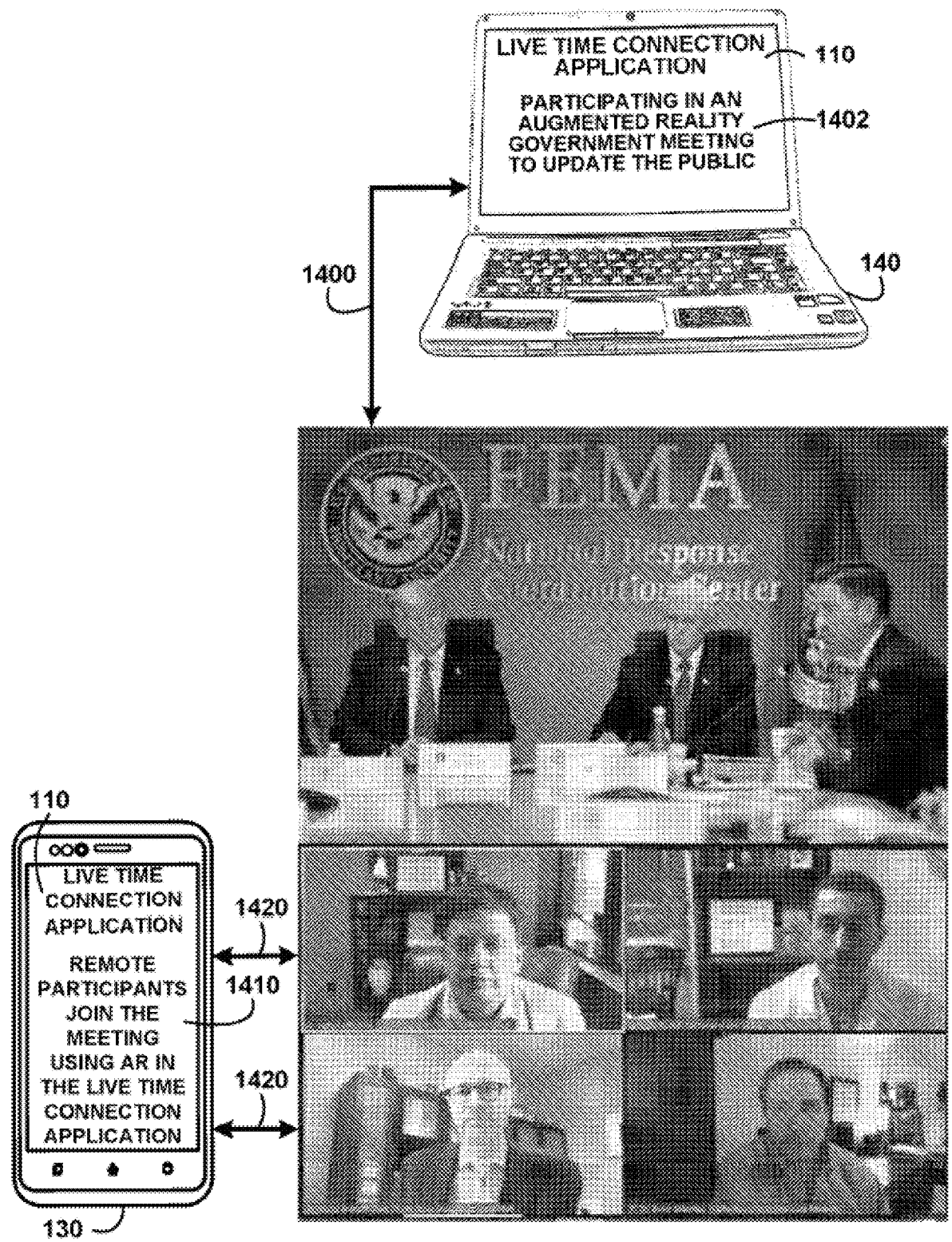
FIG. 14 shows for illustrative purposes only an example of government gatherings and updating of one embodiment.

FIG. 14 shows for illustrative purposes only an example of government gatherings and updating of one embodiment. FIG. 14 shows the live time connection application 110 on a user's laptop computer 140. The live time connection application 110 provides the means 1400 for participating in an augmented reality government meeting to update the public 1402. During these times of social distancing, even government meetings work at keeping the number of people gathering for a meeting to a minimum. In this example, the live time connection application 110 on a plurality of user phone 130 installations permits remote participants to join the meeting. Remote participants join the meeting using AR in the live time connection application 1410. Each person remotely participating uses their phone to join the augmented reality government meeting 1420 of one embodiment.

Figure 15:
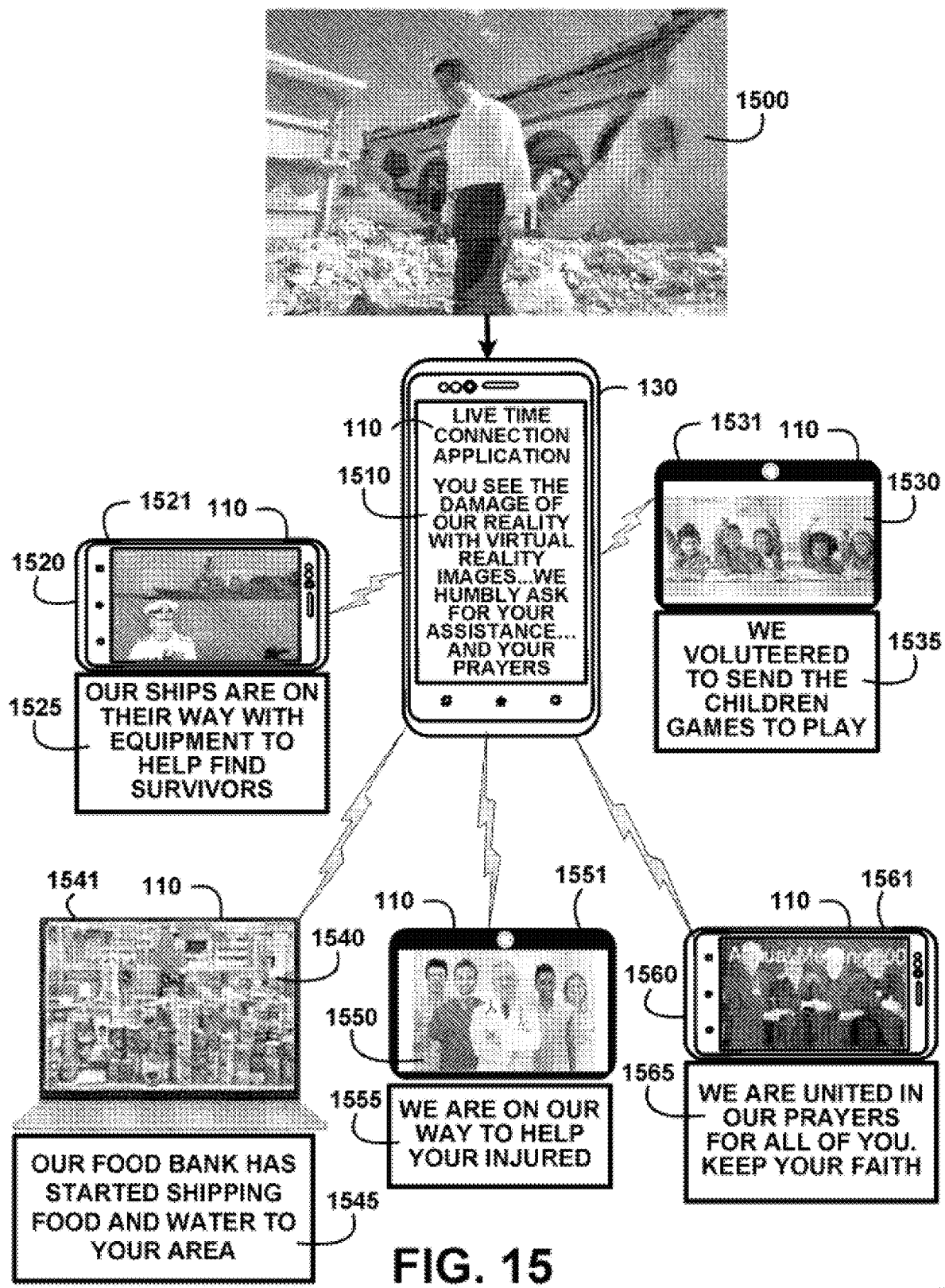
FIG. 15 shows a block diagram of an overview of the emergency social network of one embodiment.

FIG. 15 shows a block diagram of an overview of the emergency social network of one embodiment. FIG. 15 shows an official walking the site of an earthquake 1500. The official uses the live time connection application 110 on his user phone 130 to communicate to a large contingent of people his message, "You see the damage of our reality with virtual reality images . . . . We humbly ask for your assistance . . . and your prayers." 1510. The official begins to quickly receive several replies from others using the live time connection application 110. From an Admiral's phone 1521 with the live time connection application 110 the official receives this message from a U.S. Navy Admiral 1520, "Our ships are on their way with equipment to help find survivors" 1525. The message includes a VR image of two ships.

Another message comes from a teacher's tablet 1531 with the live time connection application 110. The VR image was sent with the message of elementary students 1530 with their hands raised for volunteering. The message is from the elementary students 1530 "We volunteered to send the children games to play" 1535. The social aspect of the earthquake disaster is not lost on the elementary students 1530 who realize the children in the disaster area are still children and the games will be a good diversion during these tough conditions.

A food bank worker's laptop computer 1541 with the live time connection application 110 shows an AR image of food bank food supplies 1540. The accompanying message relays the news that "our food bank has started shipping food and water to your area" 1545. This was welcomed news for the officials as food has been in short supply.

The live time connection application 110 on a Doctor's tablet 1551 carried much-needed news of the Doctor and Nurses 1550 shown in a VR image. The Doctor and Nurses 1550 tell the official "We are on our way to help your injured" 1555.

Additional medical personnel providing medical attention to the injured will ease their suffering and may save lives in the wake of the disaster.

The official's request "You see the damage of our reality with virtual reality images . . . . We humbly ask for your assistance . . . and your prayers." 1510 prompted an unusual response from a clergyman's phone 1561 with the live time connection application 110. A group of clergymen of different faiths 1560 is shown in the VR image with the message attached. This group of clergymen of different faiths 1560 joined together to express their compassion and concern with their message "We are united in our prayers for all of you. Keep your faith." 1565. The live time connection application 110 provided the vehicle for this emergency social network to quickly gather resources and effort to help others in their time of need. The VR and AR images of the enthusiastic smiles transmit the unspoken message that you are not alone, and we are here with you to help, of one embodiment.

Figure 16:
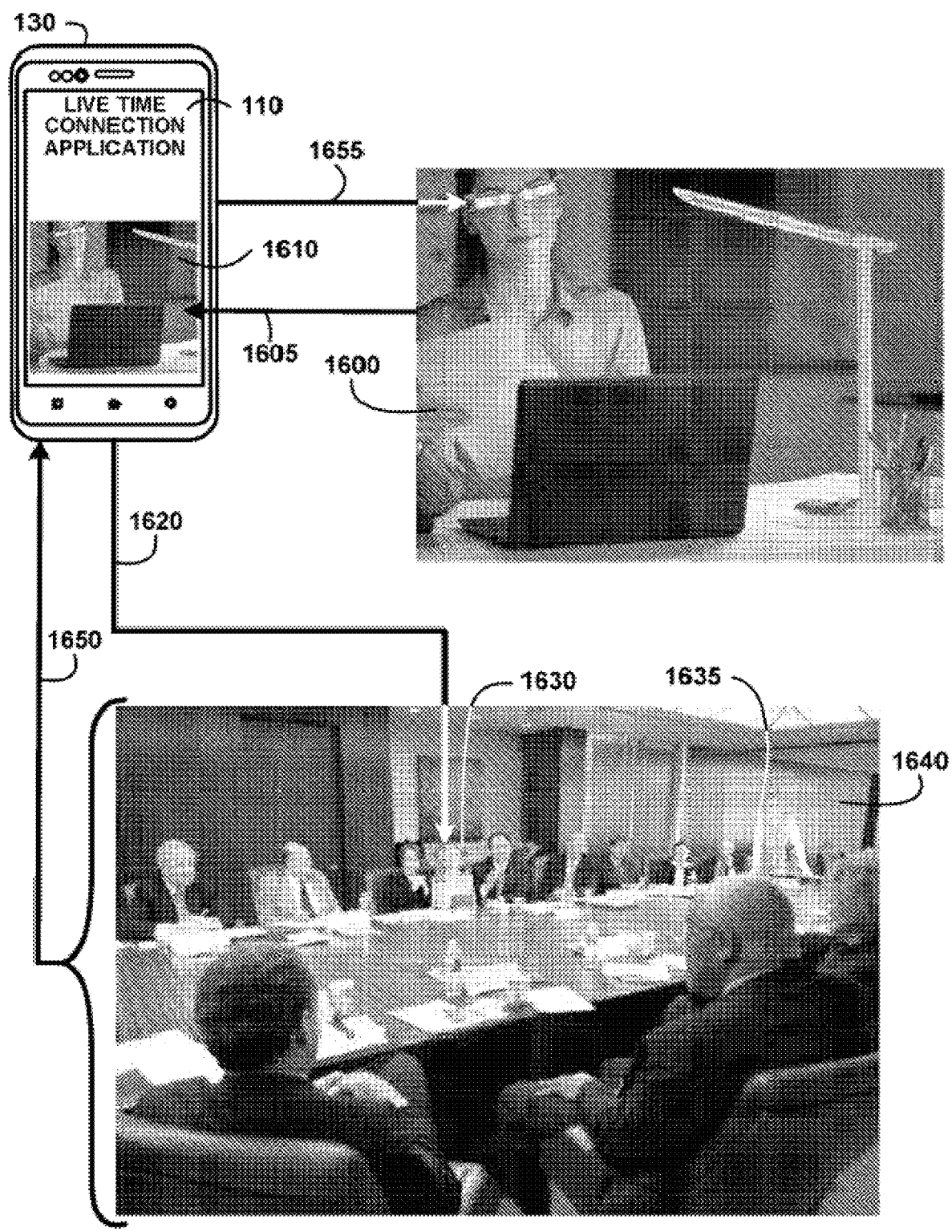
FIG. 16 shows a block diagram of an overview of corporate work from home-telecommuting of one embodiment.

FIG. 16 shows a block diagram of an overview of corporate work from home-telecommuting of one embodiment. FIG. 16 shows the live time connection application 110 being used on a user phone 130 for telecommuting. The user is a remote corporate officer at her remote office attending an AR board meeting wearing AR glasses 1600. Telecommuting saves a great deal of travel time that can be put to better productive efforts. Eliminating travel and hotel expenses can produce significant economic savings for a company. Another benefit is eliminating the physical wear and tear on the personnel traveling from remote locations. In this example, the AR image and communications from the remote corporate officer are transmitted using the live time connection application 1605.

The AR image being transmitted 1610 puts the remote corporate office into the board room as though she was physically attending the meeting. The transmitted AR image signal is received in a holographic format in board room 1620. The board meeting attendees in the room can see and hear the remote corporate office like she was sitting across the table from them. The remote corporate officer seen sitting at the table in a holographic image 1630 using the live time connection application 110 reality features sees and hears the other attendees as well as if she were in the room. Another remote board meeting attendee is shown on the board room display 1635 who is also taking advantage of telecommuting.

The board meeting room 1640 also has installed AR cameras capturing board room meeting AR images and signals are transmitted to the remote corporate officer's phone 1650. The board room meeting AR images and signal transmitted to the remote corporate officer's phone are relayed to the AR glasses 1655 being worn. This provides the connection with her fellow corporate officers and shortens the distance of the remote situation of one embodiment.

Figure 17:
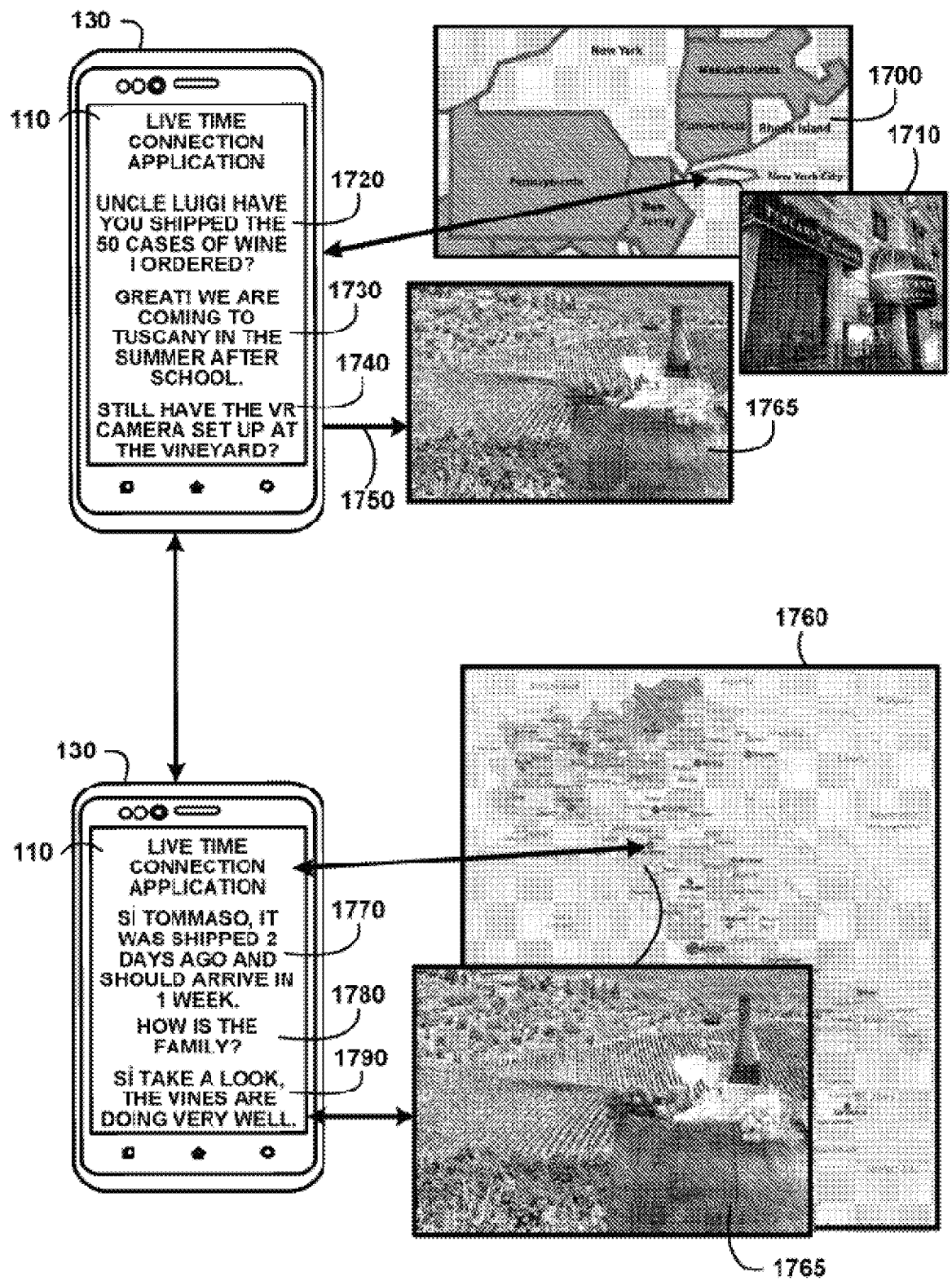
FIG. 17 shows a block diagram of an overview of business and social deal-making worldwide of one embodiment.

FIG. 17 shows a block diagram of an overview of business and social deal-making worldwide of one embodiment. FIG. 17 shows the live time connection application 110 installed on a user phone 130. This user owns a restaurant, and orders supplies from other countries. The location of the user's restaurant is New York City 1700. The user's restaurant 1710 is seen in a VR image from a street view. The user is placing a VR call to Tuscany, Italy 1760 to communicate with the wine vendor he orders from in Tuscany.

It is shown in the Tuscany vineyard of the user's wine vendor 1765. The call begins with the user saying, "Uncle Luigi have you shipped the 50 cases of wine I ordered?" 1720. The user's uncle in Tuscany replies "Sì Tommaso, it was shipped 2 days ago and should arrive in 1 week." 1770. Uncle Luigi queries the user with a question "How is the family?" 1780. The user responds with "Great! We are coming to Tuscany in the summer after school." 1730. Taking advantage of the live time connection application 110 VR capability the user asks, "Still have the VR camera set up at the vineyard?" 1740. Uncle Luigi replies "Sì, take a look, the vines are doing very well" 1790. A VR camera signal transmitted to the user's phone 1750 allows the user to see VR images of the Tuscany Vineyard 1765 as though he had already made the trip.

The live time connection application 110 facilitates and provides the means for doing business worldwide. The live time connection application 110 uses reality technology to close the distance gap to bring the parties in closer contact. The live time connection application 110 also brings distant family members and friends closer together to share common experiences. And as shown in this example the two activities business and social life can be joined comfortably using the live time connection application 110 of one embodiment.

Figure 18A:
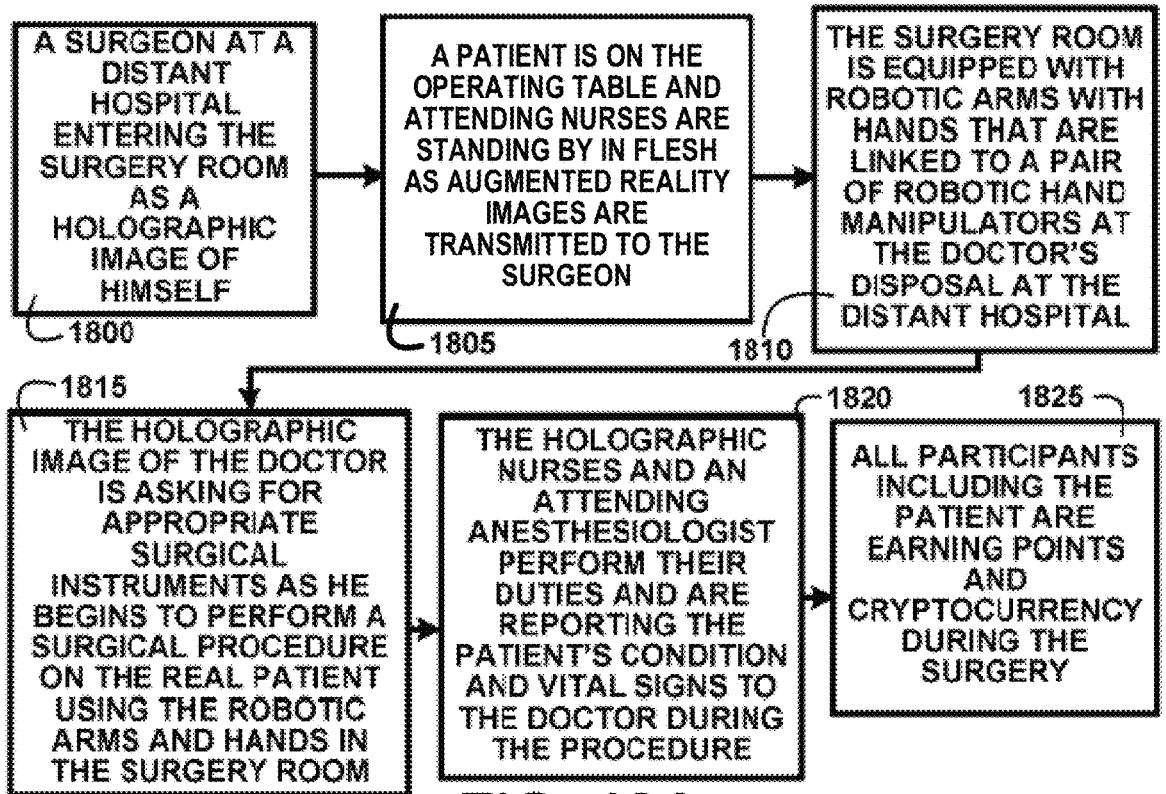
FIG. 18A shows a block diagram of an overview of a holographic doctor performing distant AR robotic surgery connection of one embodiment.

FIG. 18A shows a block diagram of an overview of a holographic doctor performing distant AR robotic surgery connection of one embodiment. FIG. 18A shows a surgeon at a distant hospital entering the surgery room as a holographic image of himself 1800. A patient is on the operating table and attending nurses are standing by in the flesh as augmented reality images are transmitted to the surgeon 1805. The surgery room is equipped with robotic arms that are linked to a pair of robotic hand manipulators at the doctor's disposal at the distant hospital 1810. The holographic image of the doctor is asking for appropriate surgical instruments as he begins to perform a surgical procedure on the real patient using the robotic arms and hands in surgery room 1815.

The nurses and an attending anesthesiologist perform their duties and report the patient's condition and vital signs to the doctor during the procedure 1820. The holographic surgeon asks a voice-activated control on the login computer to zoom in and out as needed when he is making incisions and checking the nurse's clamping veins as directed by the holographic surgeon. The nurses position the surgical instruments in the robotic hands as directed by the holographic surgeon. All participants including the patient are earning points and cryptocurrency during the surgery 1825 of one embodiment.

Figure 18B:
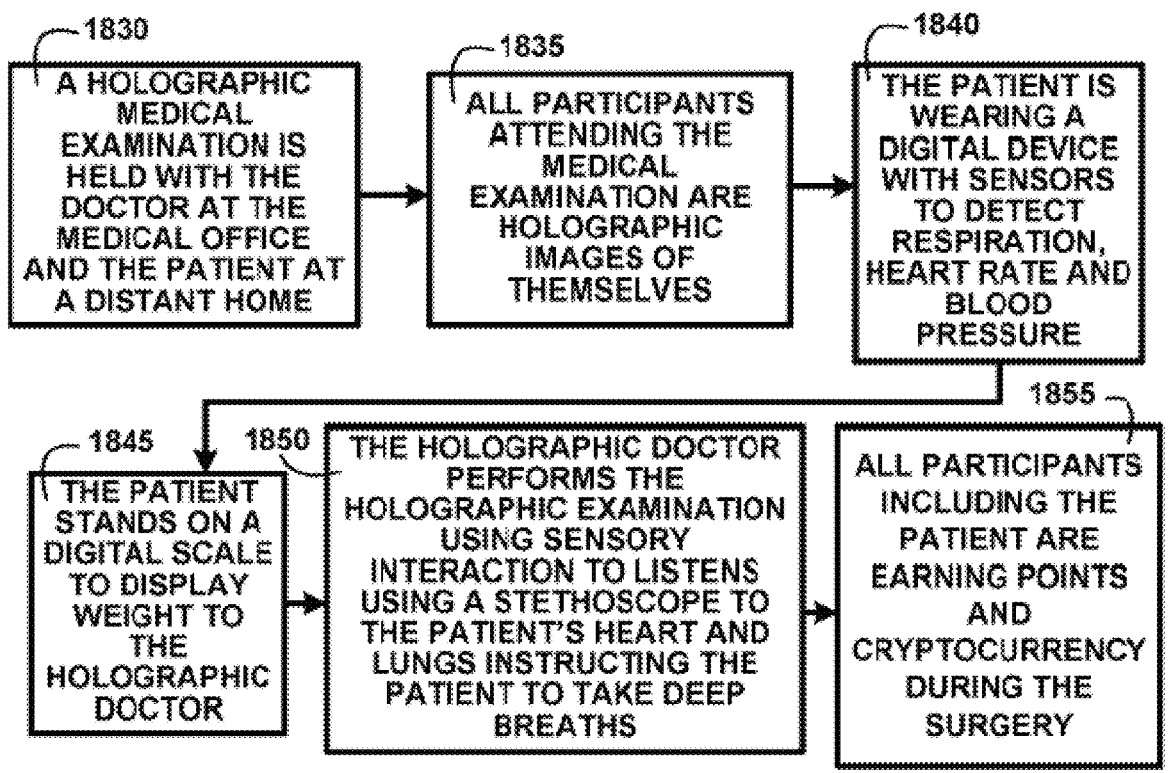
FIG. 18B shows a block diagram of an overview of a holographic AR medical examination connection of one embodiment.

FIG. 18B shows a block diagram of an overview of a holographic AR medical examination connection of one embodiment. FIG. 18B shows a holographic medical examination being held with the doctor at the medical office and the patient at a distant home 1830. All participants attending the medical examination are holographic images of themselves 1835. The patient is wearing a digital device with sensors to detect respiration, heart rate, and blood pressure 1840. The vital signs detected by the sensors are transmitted to the doctor for viewing on a screen and are also announced by a text-to-voice device. The patient stands on a digital scale to display weight to the holographic doctor 1845. The holographic doctor performs the holographic examination using sensory interaction to listen using a holographic stethoscope to the patient's heart and lungs instructing the patient to take deep breaths 1850. The holographic doctor writes a holographic prescription for the patient. The holographic prescription is processed with OCR and transmitted to the patient's pharmacy for delivery to her home.

An elderly patient saves asking for a ride to the doctor's office from a neighbor and family members. The elderly patient can go about their daily activities and when the doctor calls put on their AR glasses and have the examination. Both the patient and doctor prevent any infection from personal contact and can perform a thorough medical examination. The record of the medical examination is noted and transcribed in the patient's EHR. The doctor's billing is prepared from the recorded examination in the EHR and is processed. All participants including the patient are earning points and cryptocurrency during the medical examination 1855. The patient will pay for the prescription using earnings from the live time connection application with their participating pharmacy of one embodiment.

Figure 19A:
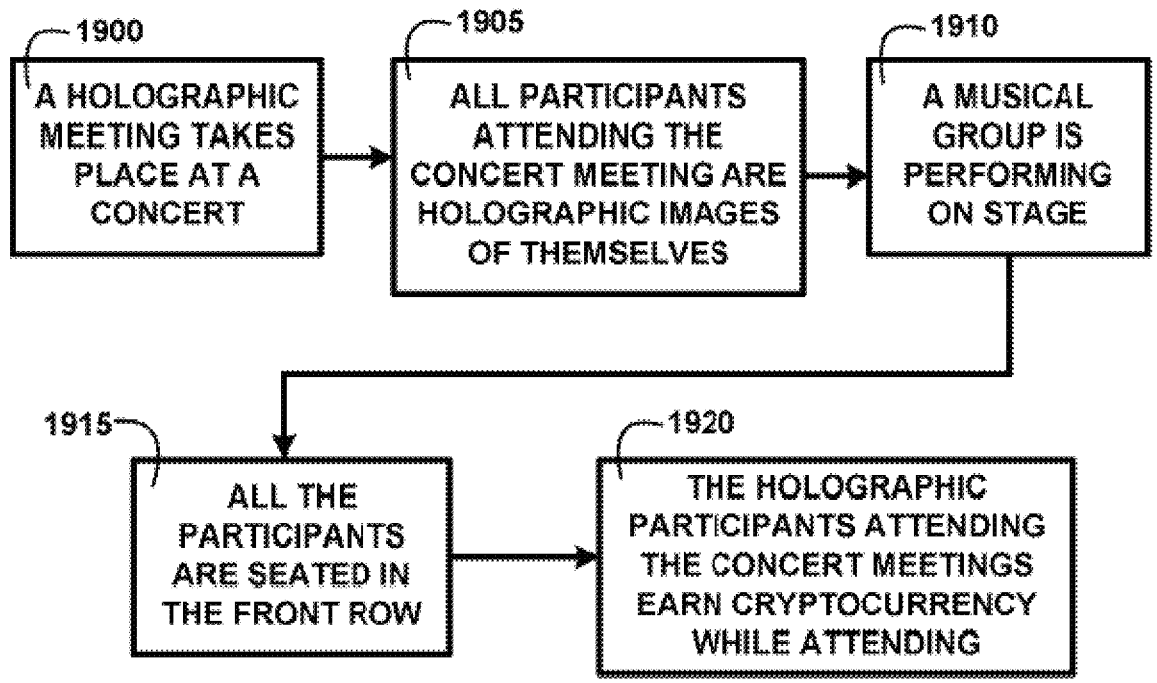
FIG. 19A shows a block diagram of an overview of a holographic AR meeting connection that takes place at a concert of one embodiment.

FIG. 19A shows a block diagram of an overview of a holographic AR meeting connection that takes place at a concert of one embodiment. FIG. 19A shows a holographic meeting that takes place at a concert 1900. A group of friends separated by great distances decide to attend the same concert together. All participants attending the concert meeting are holographic images of themselves 1905. A musical group performing on stage 1910. All the participants are seated in the front row 1915. Being near each other and enjoying the concert shortens the distance and strengthens the bonds between them. The memories of all of them attending the concert will spark storytelling for years to come. The holographic participants attending the concert meetings earn cryptocurrency while attending 1920 of one embodiment.

Figure 19B:
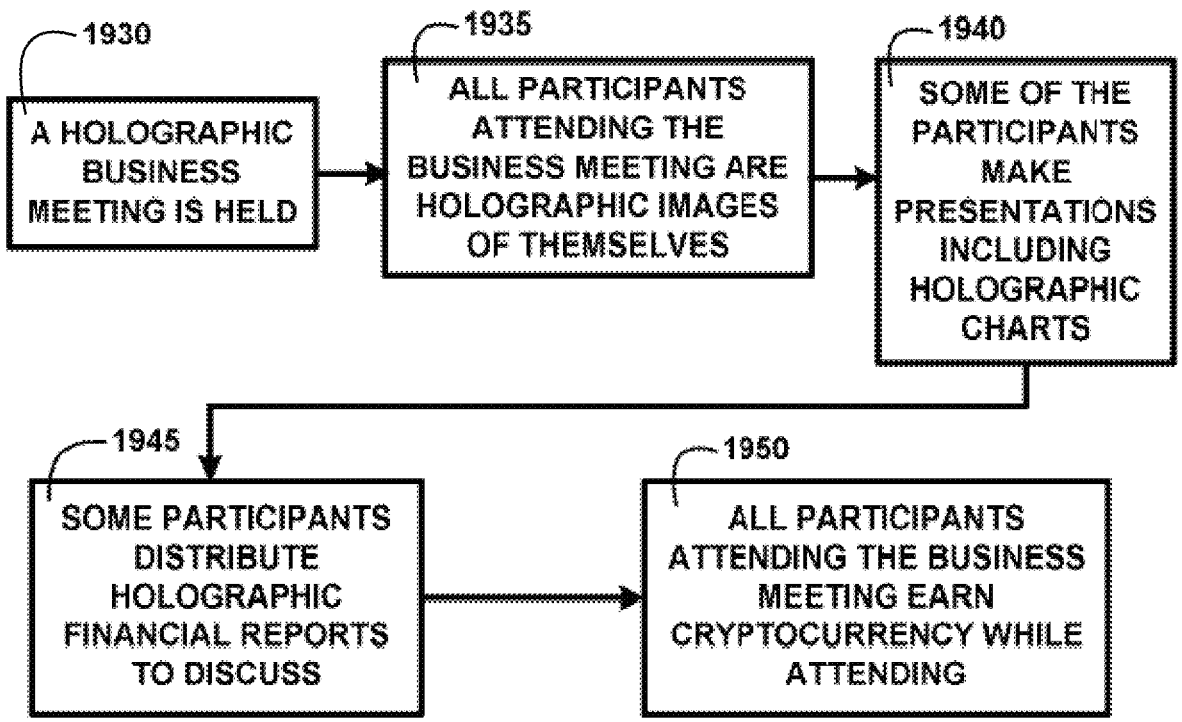
FIG. 19B shows a block diagram of an overview of a holographic AR business meeting connection of one embodiment.

FIG. 19B shows a block diagram of an overview of a holographic AR business meeting connection of one embodiment. FIG. 19B shows when a holographic business meeting is held 1930. All participants attending the business meeting are holographic images of themselves 1935. During the meeting, all the participants see and hear each other clearly in the AR environment. Some of the participants make presentations including holographic charts 1940. Some participants distribute holographic financial reports to discuss 1945. The participants can flip pages of the holographic financial reports and then ask questions and discuss the data in the reports. All participants attending the business meeting earn cryptocurrency while attending 1950 of one embodiment.

Figure 20A:
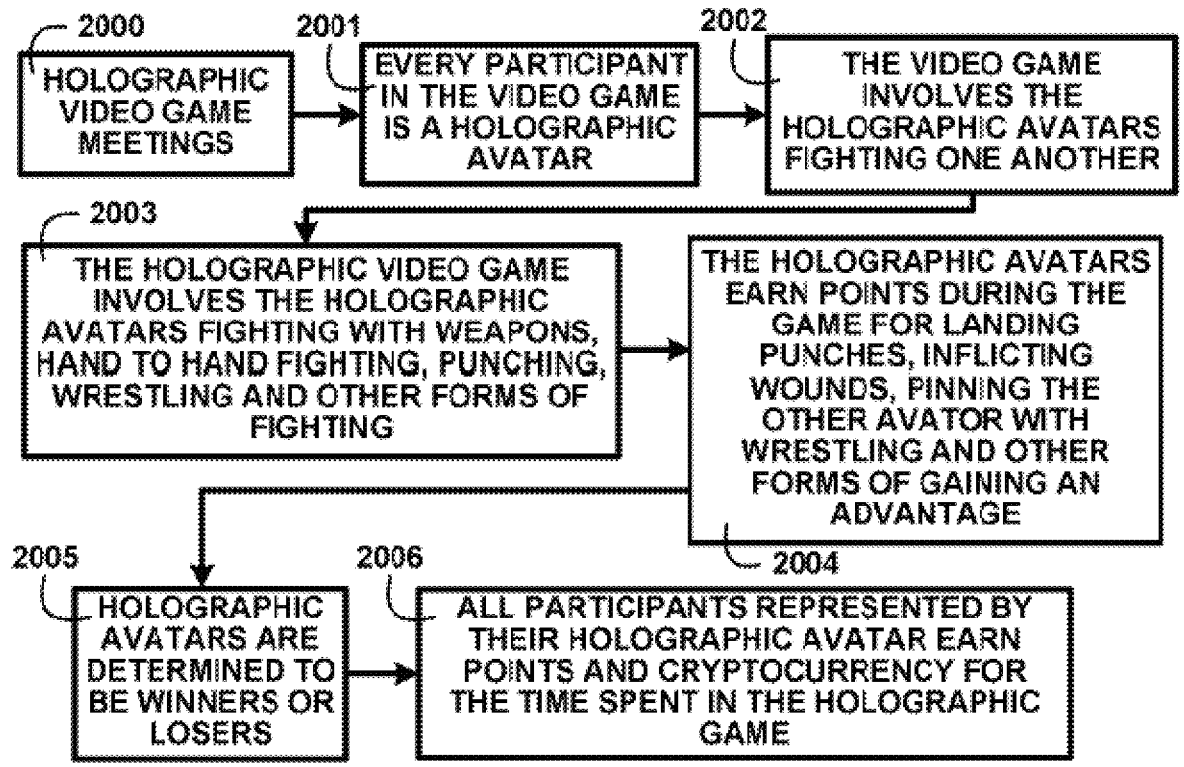
FIG. 20A shows a block diagram of an overview of holographic AR video game meetings of one embodiment.

FIG. 20A shows a block diagram of an overview of holographic AR video game meetings of one embodiment. FIG. 20A shows an example of holographic video game meetings in 2000. Every participant in the video game is a holographic avatar 2001. The video game involves the holographic avatars fighting one another 2002. The holographic video game involves the holographic avatars fighting with weapons, hand-to-hand fighting, punching, wrestling, and other forms of fighting 2003. The holographic avatars earn points during the game for landing punches, inflicting wounds, pinning another avatar with wrestling, and other forms of gaining an advantage 2004. The AR video game is configured to interpret the various results of each participant's actions and then assess the action to determine if an advantage has been gained. Holographic avatars are determined to be winners or losers 2005 based on the points accumulated during the period of the fighting. All participants represented by their holographic avatar earn points and cryptocurrency for the time spent in the holographic game 2006 of one embodiment.

Figure 20B:
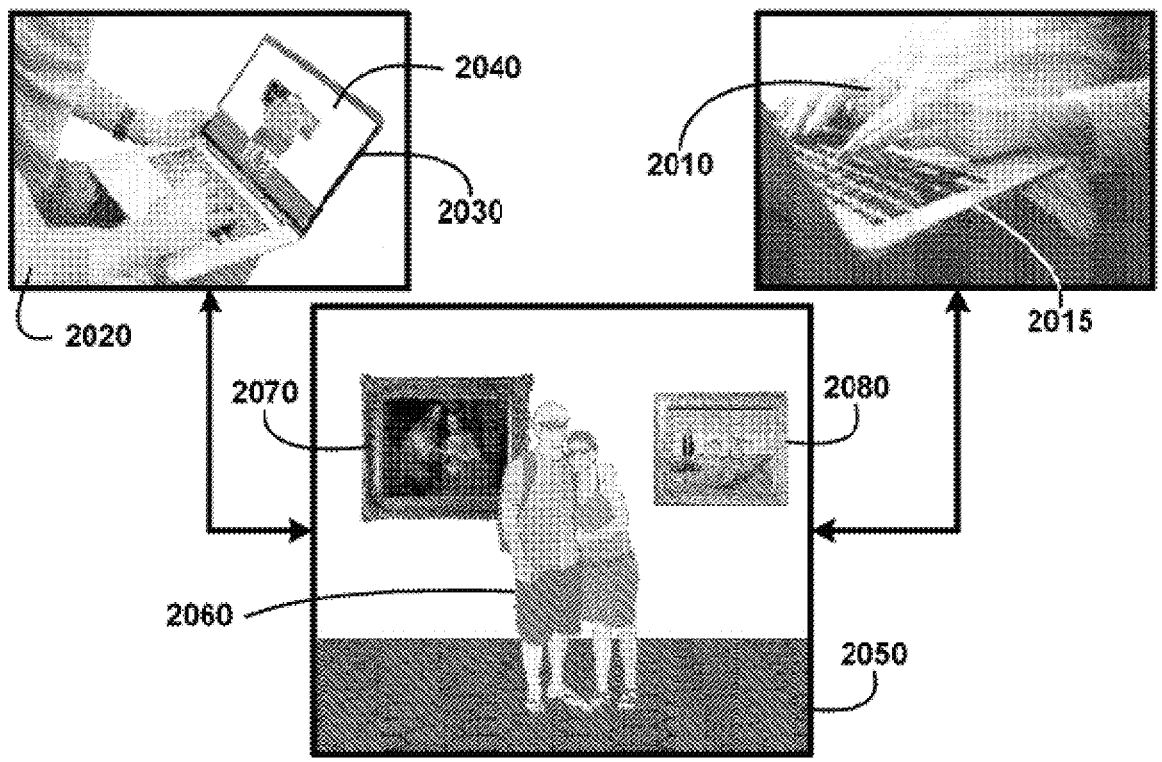
FIG. 20B shows for illustrative purposes only an example of a holographic AR dating connection of one embodiment.

FIG. 20B shows for illustrative purposes only an example of a holographic AR dating connection of one embodiment.

FIG. 20B shows a male social connection date 2020 connecting with his date using his computer in AR mode 2030. On the computer screen, the male social connection date 2020 is a holographic image of him meeting his date at an art gallery 2040. A female social connection date 2010 using her computer to meet the male social connection date in an AR location 2015. They join up at an AR real art gallery 2050. The female social connection date 2010 is seen as a holographic image of herself. In the AR real art gallery 2050 the social connection dating couple hugging using sensory interaction 2060 to experience the real-life sensation of the hugging. The social connection dating couple views and discusses the different colors and painting techniques between a Rembrandt painting 2070 and a Van Gogh painting 2080. In real life, they are both wearing AR glasses to enter the AR environment. While on the AR date, they are wearing sunglasses so when they leave the art gallery, they can go for a walk outdoors in the sun of one embodiment.

Figure 21:
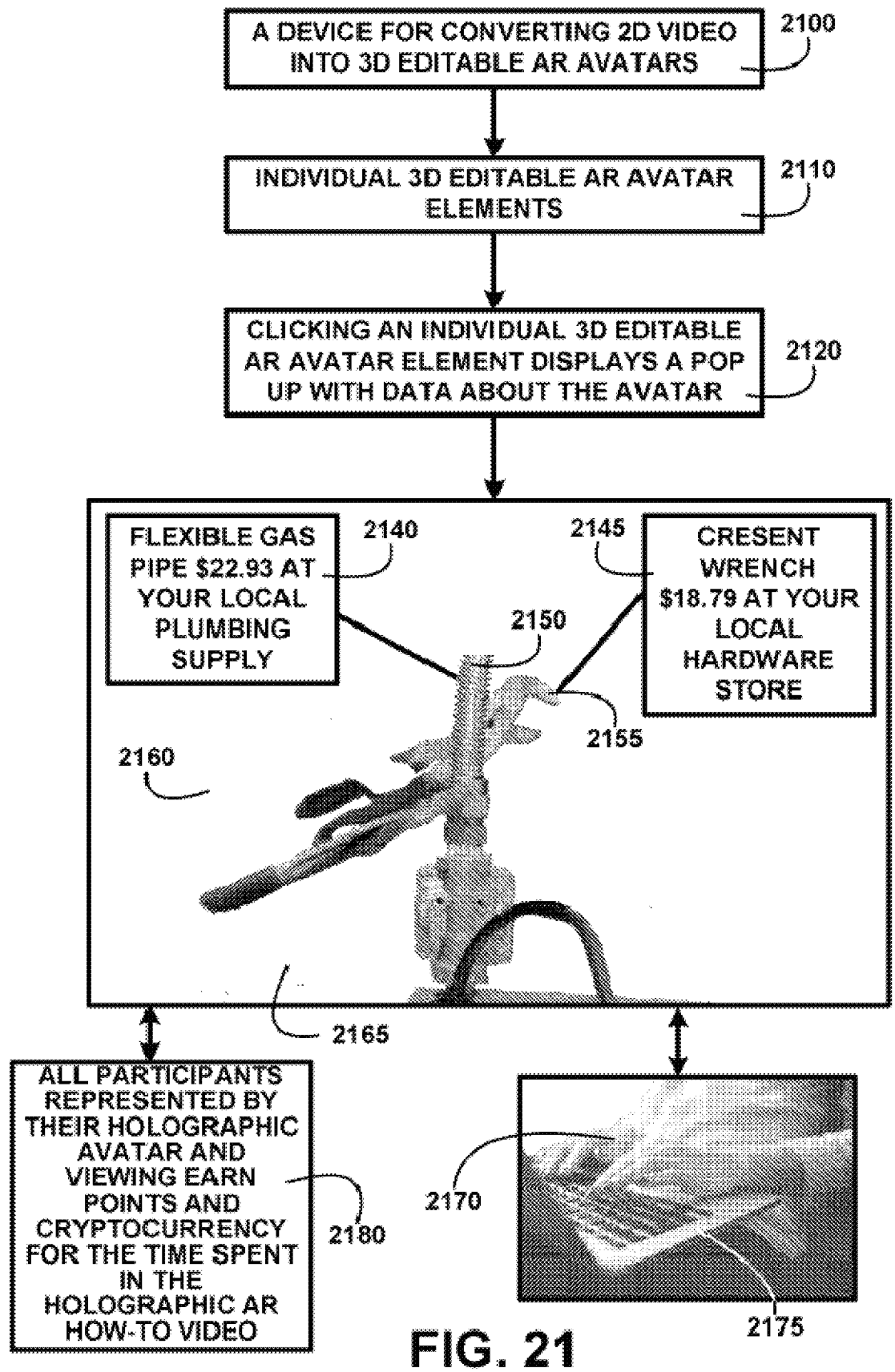
FIG. 21 shows for illustrative purposes only an example of a holographic AR how-to connection of one embodiment.

FIG. 21 shows for illustrative purposes only an example of a holographic AR how-to connection of one embodiment. FIG. 21 shows a device for converting 2D video into 3D editable AR avatars 2100. Individual 3D editable AR avatar elements 2110 are the plumbing instructing in the video and tools and parts including pipes and fittings used in the 3D AR video. A user viewer by clicking an individual 3D editable AR avatar element displays a pop-up with data about the avatar 2120, for example, a pipe. A female social connection 2170 watching in this example a how-to AR plumbing repair segment 2165 with a holographic plumber 2160 making a natural gas line replacement. A user's computer is being used to log in and learn hands-on how to make home plumbing repairs to save money 2175.

The female social connection clicks on a wrench 2155. A pop-up displays the type of wrench a crescent wrench $18.79 at your local hardware store 2145. The female social connection clicks on a pipe 2150. A pop-up displays a flexible gas pipe for $22.93 at your local plumbing supply 2140. The female social connection now knows the tools she needs the type of pipe to use and the prices and where to buy them. In this example, the individual 3D editable AR avatar elements are not shown as holograms for illustrative purposes only. The plumber is wearing AR gloves to enable his 3D editable AR avatar element to pick up and handle the individual 3D editable AR avatar elements.

The female social connection puts on a pair of AR gloves. She as a holographic image enters the AR environment to try using the tool and replacing the pipe herself. She also has been earning cryptocurrency while using the app to save money. She in one embodiment barters for the tool and pipe with her social connection earnings. In another embodiment, she will transfer some of her cryptocurrency to fiat currency to buy the tool and pipe.

Figure 22:
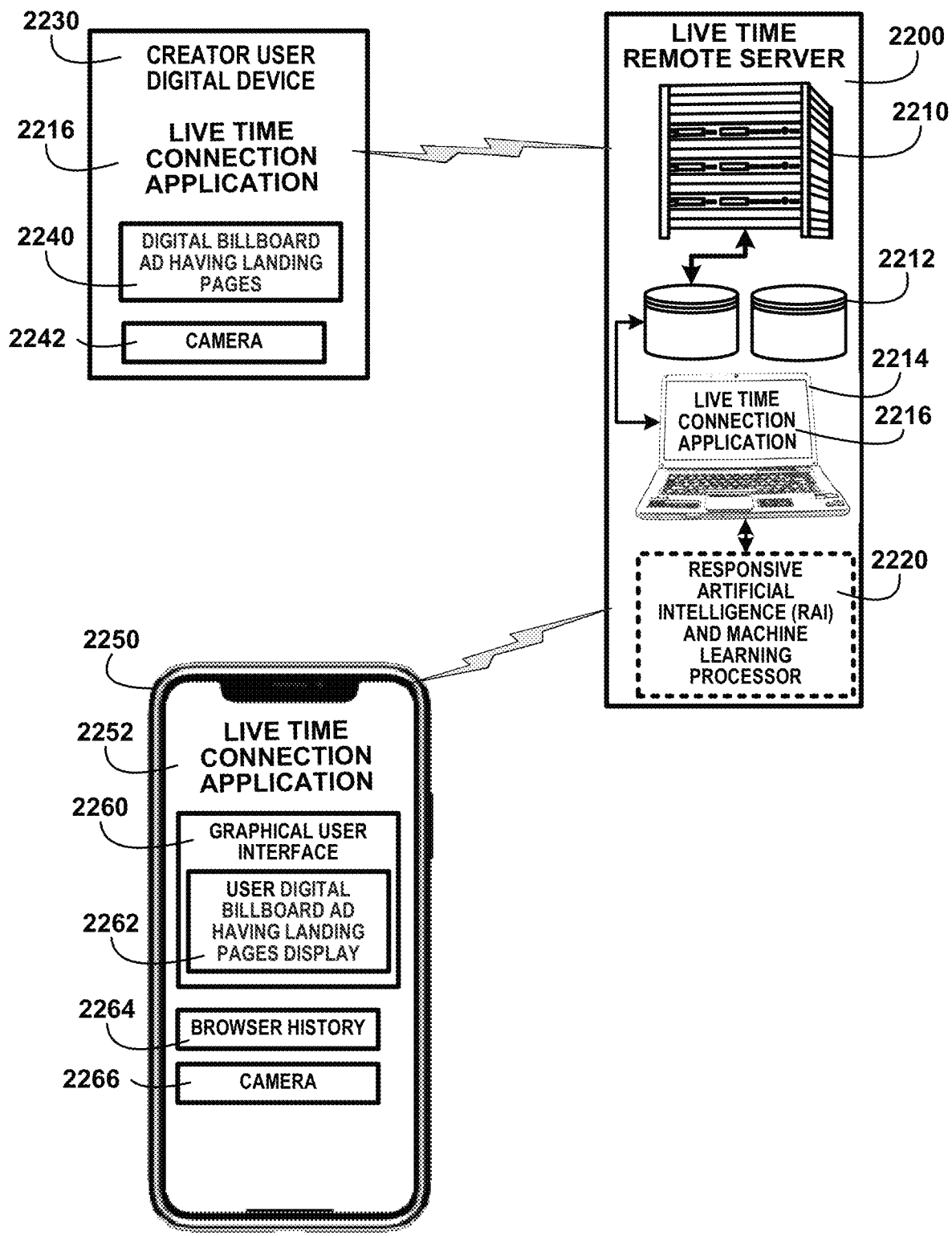
FIG. 22 shows for illustrative purposes only an example of responsive artificial intelligence (RAI) and machine learning advertising of one embodiment.

FIG. 22 shows for illustrative purposes only an example of responsive artificial intelligence (RAI) and machine learning advertising of one embodiment. FIG. 22 shows a live time remote server platform 2200, server device 2210, a plurality of databases 2212, platform computer 2214 having the live time connection application 2216, responsive artificial intelligence (RAI), and machine learning processor 2220. The responsive artificial intelligence (RAI), and machine learning processor 2220 include a recorded knowledge base that is continually being updated with current information and practices.

In one embodiment the knowledge base includes facial recognition techniques to detect facial characteristics for identifying a person from a photograph or image. In another embodiment the knowledge base includes language dictionaries, pronunciation tools and examples, grammar and spelling guides to detect a targeted audience user's language preference, and translation tools to convert, for example, a billboard advertisement from one language to a different language in both text and audio. In some instances, a product being advertised may be culturally aligned to a distinct targeted audience related to that culture and the content provider may choose to design the billboard and landing pages in a language other than the content provider's language.

The responsive artificial intelligence (RAI), and machine learning processor 2220 can perform real time translations for the content provider as the advertisements, social media and communications content are being designed. Other sections of the knowledge base may include information on sports, music, popular locations and additional area of interest of targeted audiences to support detection of areas of interest related to user's preferences. The responsive artificial intelligence (RAI), and machine learning processor 2220 can compare a user's gathered preferences to the information in the knowledge bases to make specific personalization of the advertisements with matches of the comparisons.

The Responsive artificial intelligence (RAI) and machine learning processor 2220 generate advertisements, social media and communications content that is personalized for each targeted audience user. Responsive artificial intelligence (RAI) and machine learning processor 2220 gathered demographic, and other data from the user's mobile device, for example, to translate both an audio and a textual advertisement into the detected language, and location, to personalize the advertisement to the user's preferences. A creator user digital device 2230 having a live time connection application 2216 is used to register the user on the server 2210. The user is provided with a digital billboard advertisement having landing pages 2240 for access to e-commerce and advertising. A creator user digital device 2230 camera 2242 is used by the user to design content for the advertisement with images and videos. The user digital billboard advertisement is stored on the plurality of databases 2212 for display on social media sites.

The platform computer 2214 having the live time connection application 2216 detects the digital billboard advertisement being selected by a targeted user mobile device 2250 having a live time connection application 2252. Responsive artificial intelligence (RAI) and machine learning processor 2220 gather demographic, and other data from the user's mobile device, for example, from the targeted user's mobile device browser history 2264. The targeted user's mobile device 2250 camera 2266 is used by the platform computer 2214 to capture an image of the targeted user.

The gathered browser history 2264 is used by the responsive artificial intelligence (RAI) and machine learning processor 2220 to translate both an audio and a textual advertisement into the detected targeted user language, and location, and add items of interest of the targeted user to personalize the advertisement to the user's preferences. The responsive artificial intelligence (RAI) and machine learning processor 2220 also uses the targeted user mobile device 2250 graphical user interface 2260 to integrate into the user digital billboard advertisement having landing pages display 2262 in real-time images of the user's preferences into the advertisement, for example, favorite pets and locations visited by the targeted user of one embodiment.

Figure 23:
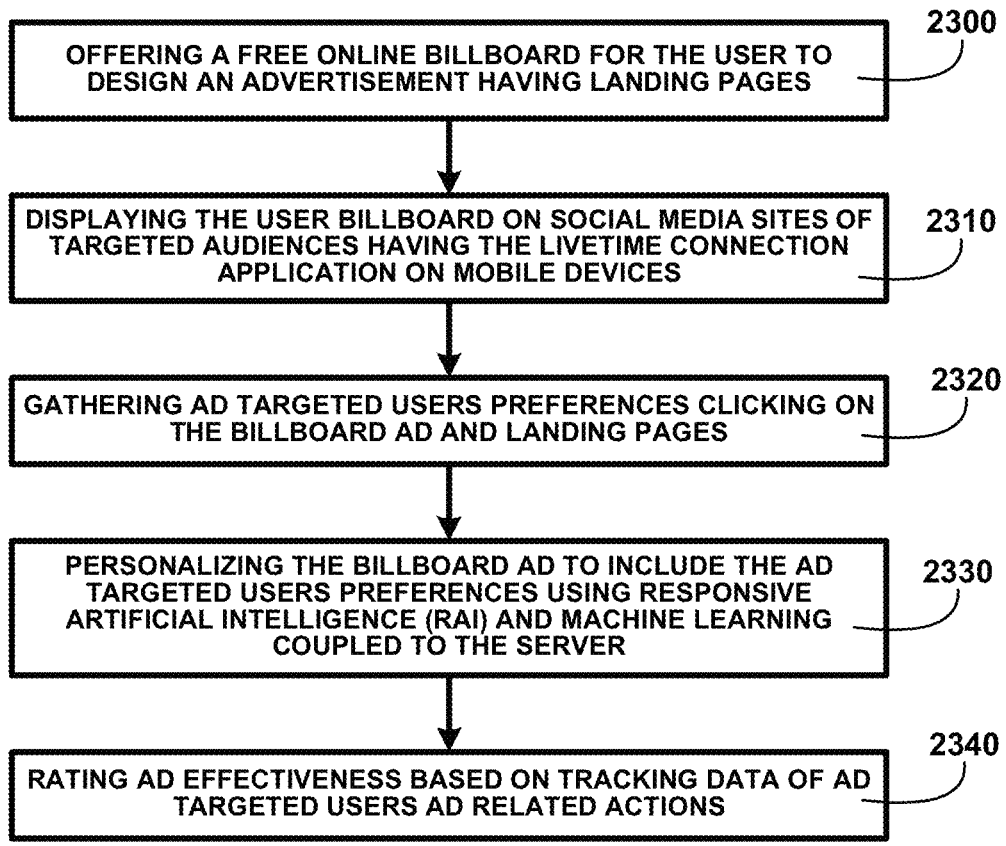
FIG. 23 shows a block diagram of an overview of a digital billboard ad of one embodiment.

FIG. 23 shows a block diagram of an overview of a digital billboard advertisement of one embodiment. FIG. 23 shows the server 2210 of FIG. 22 offering a free online billboard for the user to design an advertisement having landing pages 2300. The user advertisement displays the user billboard on social media sites of targeted audiences having the live time connection application on mobile devices 2310. The RAI and machine learning processor 2220 of FIG. 22 is gathering ad-targeted users' preferences by clicking on the billboard advertisement and landing pages 2320.

The gathered targeted users' preferences are integrated into the user billboard advertisement for personalizing the billboard advertisement to include the advertisement targeted users' preferences using RAI and machine learning coupled to the server 2330. The user-personalized advertisements offer incentives for targeted users to click on the billboard landing pages and purchase advertised goods and services. The server 2210 of FIG. 22 uses analytics for rating advertisement effectiveness based on tracking data of ad-targeted users advertisement ad-related actions 2340 of one embodiment.

Figure 24:
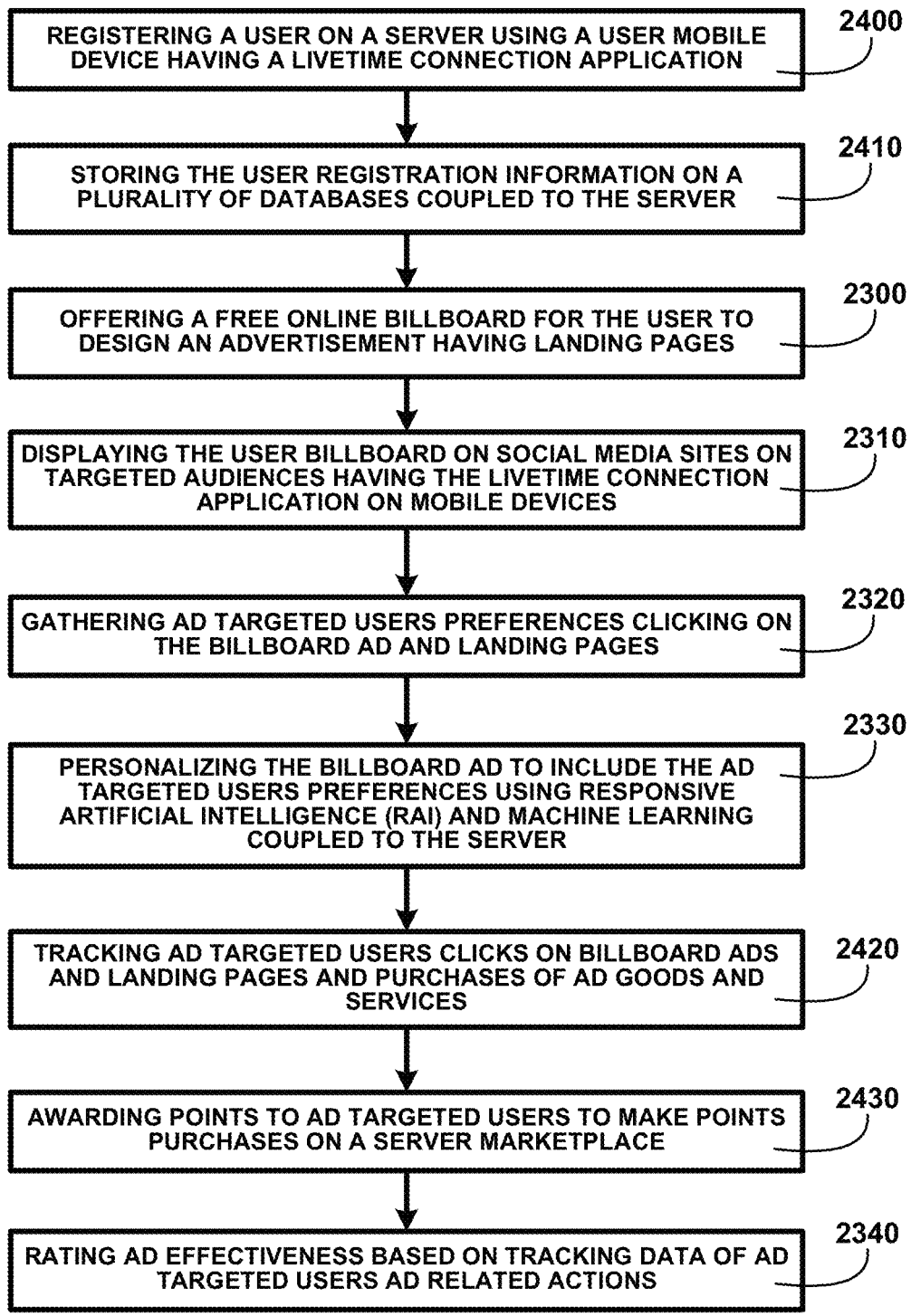
FIG. 24 shows a block diagram of an overview flow chart of targeted user RAI advertising of one embodiment.

FIG. 24 shows a block diagram of an overview flow chart of targeted user RAI advertising of one embodiment. FIG. 24 shows registering a user on a server using a user's mobile device having a live time connection application 2400. Storing the user registration information on a plurality of databases coupled to the server 2410. Offering a free online billboard for the user to design an advertisement having landing pages 2300. Displaying the user billboard on social media sites on targeted audiences having the live time connection application on mobile devices 2310. Gathering ad-targeted users' preferences by clicking on the billboard advertisement and landing pages 2320. Personalizing the billboard advertisement to include the advertisement targeted users' preferences using responsive artificial intelligence (RAI) and machine learning coupled to the server 2330. Tracking ad-targeted users' clicks on billboard advertisements and landing pages and purchases of advertisement goods and services 2420. Awarding points to ad-targeted users to make points purchases on a server marketplace 2430. Rating advertisement effectiveness based on tracking data of advertisement targeted users advertisement ad-related actions 2340 of one embodiment.

Figure 25:
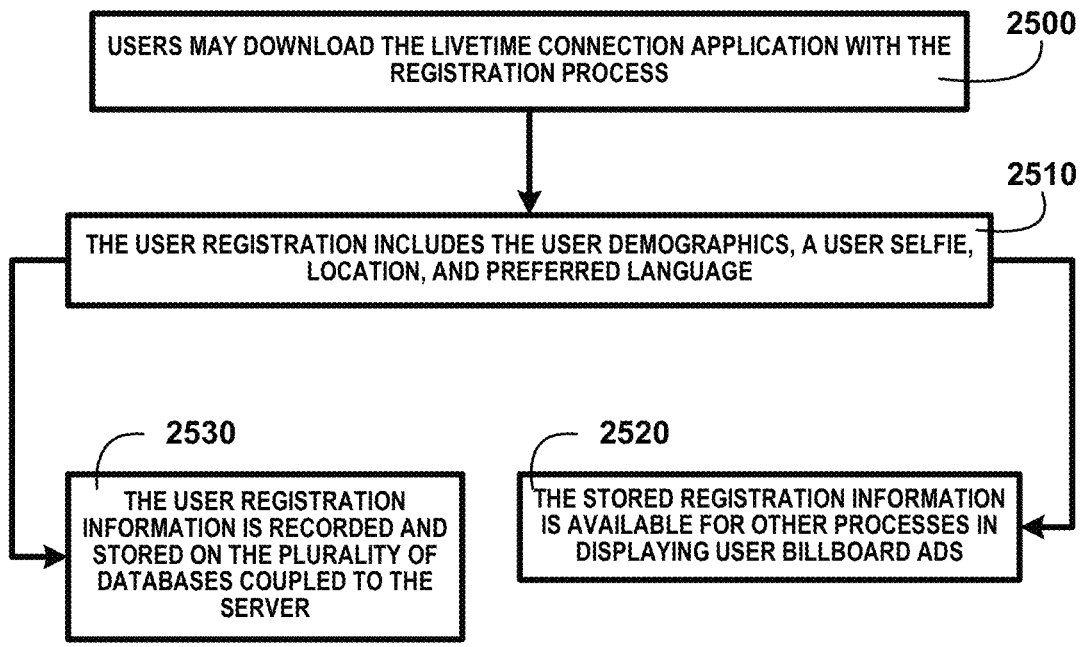
FIG. 25 shows a block diagram of an overview of an online user registration of one embodiment of one embodiment.

FIG. 25 shows a block diagram of an overview of an online user registration of one embodiment of one embodiment. FIG. 25 shows users may download the live time connection application with the registration process 2500. The user registration includes the user demographics, a user selfie, location, and preferred language 2510. The stored registration information is available for other processes in displaying user billboard advertisements 2520. The user registration information is recorded and stored on the plurality of databases coupled to the server 2530 of one embodiment.

Figure 26:
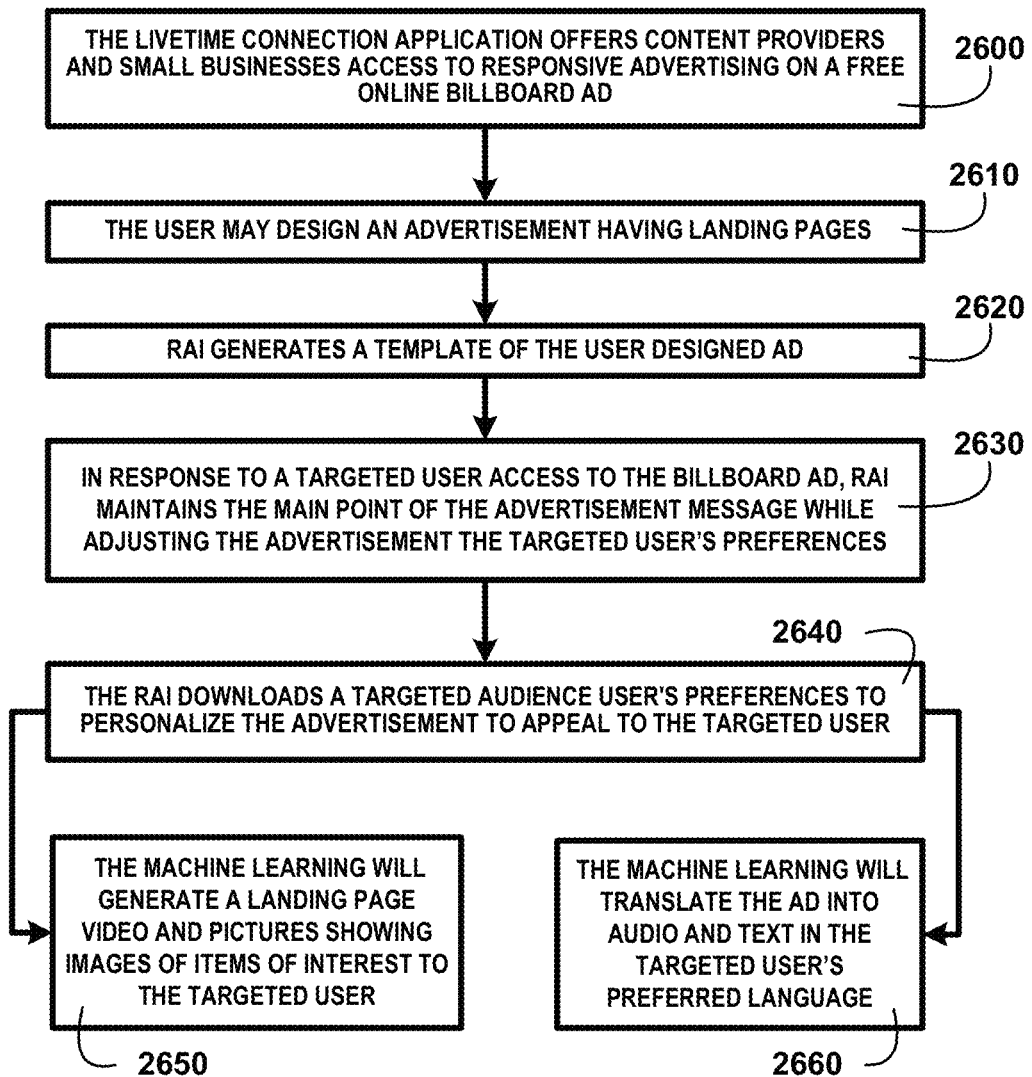
FIG. 26 shows a block diagram of an overview of a free online billboard ad of one embodiment.

FIG. 26 shows a block diagram of an overview of a free online billboard advertisement of one embodiment. FIG. 26 shows the live time connection application that offers content providers and small businesses access to responsive advertising on a free online billboard advertisement 2600. The live-time connection platform uses RAI for social media, gaming, communications, augmented reality, and virtual reality, and brings machine learning and responsiveness to social media, gaming, and communications. The availability of augmented reality and virtual reality on the live time connection application provides and 3D downloadable images of products in the advertisements allow a targeted audience user to superimpose the product 3D image in the user's environment in real time to assist the user in making a purchase decision. For example, the product is a piece of art, in this example a sculpture, where the user may pick areas in a room to place the sculpture and see how it looks in the surroundings including with natural daylight from windows and current artificial lighting in a room.

Gaming is very popular and the additions of games being available both in the advertisements and as products will have a broad appeal to targeted audiences. Added to the appeal is the incentives offered to targeted users for earning points by winning a game with which the user may purchase goods and services at the system's online marketplace. Single or multi-player games being available through the advertisements and made available on social media also provides the opportunity for one targeted user to have other users join the user in playing a game where the advertisement transitions into an event that also increases the audience for the advertisement and where players share similar interests.

The user may design an advertisement having landing pages 2610. A targeted user may click on the billboard advertisement and then click on a landing page to see more details of the advertisement. RAI generates a template of the user-designed advertisement 2620. Users, content providers, and small businesses can save time using the live time remote server responsive AI to generate multiple videos in multiple languages with multiple images. In response to a targeted user's access to the billboard advertisement, RAI maintains the main point of the advertisement message while adjusting the advertisement to the targeted user's preferences 2630. RAI's capability to maintain the main point of the message while adjusting video, animation, text, holographic imaging, virtual reality, augmented reality, and imaging to a user's preferences makes the advertisement unique to the targeted user.

The RAI downloads a targeted audience user's preferences to personalize the advertisement to appeal to the targeted user 2640. The machine learning will generate a landing page video and pictures showing images of items of interest to the targeted user 2650. The responsive AI downloads a targeted audience user's preferences including background colors, lighting, images, language, lip reading, facial recognition, emotion detection, and nonverbal cues. The machine learning will translate the advertisement into audio and text in the targeted user's preferred language 2660. The RAI downloads a targeted audience user's preferences including vernacular that adjusts to the user's region, age as well as user queries, activity, and browser history of one embodiment.

The RAI downloads a targeted audience user's preferences including vernacular that adjusts to the user's region, age as well as user queries, activity, and browser history.

Examples of user's preferences include. Targeted audience users who like dogs and will have pictures of dogs in the background. Targeted audience users who like cats will have pictures of cats in the background. For a targeted audience user that tends to watch videos of blond people with brown eyes, the machine learning will generate a landing page video with people having a golden hue on their hair and brown speckles in their eyes. A sports equipment retailer launches an advertisement campaign for a sale. The machine learning will generate a landing page video showing an image of someone close to the targeted audience user's age, and gender, and doing a sports activity based on the user's activity, browser history, and personal data of one embodiment.

Figure 27:
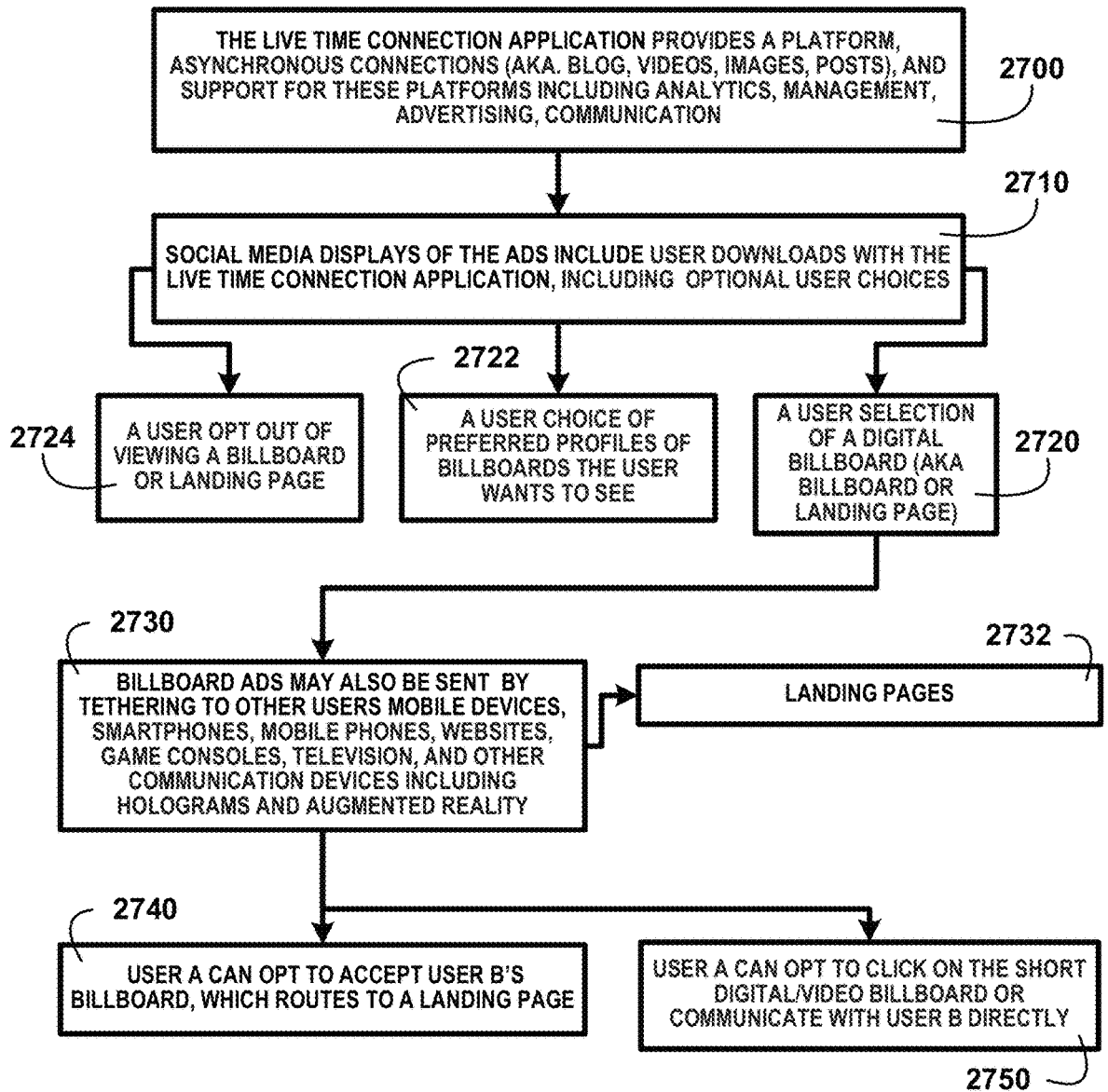
FIG. 27 shows a block diagram of an overview of RAI to generate ads with multiple videos in multiple languages of one embodiment.

FIG. 27 shows a block diagram of an overview of RAI to generate advertisements with multiple videos in multiple languages of one embodiment. FIG. 27 shows the live time connection application provides a platform, asynchronous connections (aka. blog, videos, images, posts), and support for these platforms including analytics, management, advertising, and communication 2700. Social media displays advertisements including user downloads with the live time connection application, including optional user choices 2710.

A user selection of a digital billboard (aka billboard or landing page) 2720. A user choice of preferred profiles of billboards the user wants to see 2722. A user opts out of viewing a billboard or landing page 2724. Billboard advertisements may also be sent by tethering to other users' mobile devices, smartphones, mobile phones, websites, game consoles, television, and other communication devices including holograms and augmented reality 2730, landing pages 2732. User A can opt to accept user B's billboard, which routes to landing page 2740. User A can opt to click on the short digital/video billboard or communicate with user B directly 2750. "My name is Sandy and I'm single and looking for Mr. Right. Message me here". "My name is John, and I am a realtor. "Click on the URL below to access listings in your area". "My name is Missy. For the best barbecue, click on the button below to download the location pin of Sandy's barbecue and grill near you". "I'll give you 2 points if you go to my website. Click on this link URL" of one embodiment.

Figure 28:
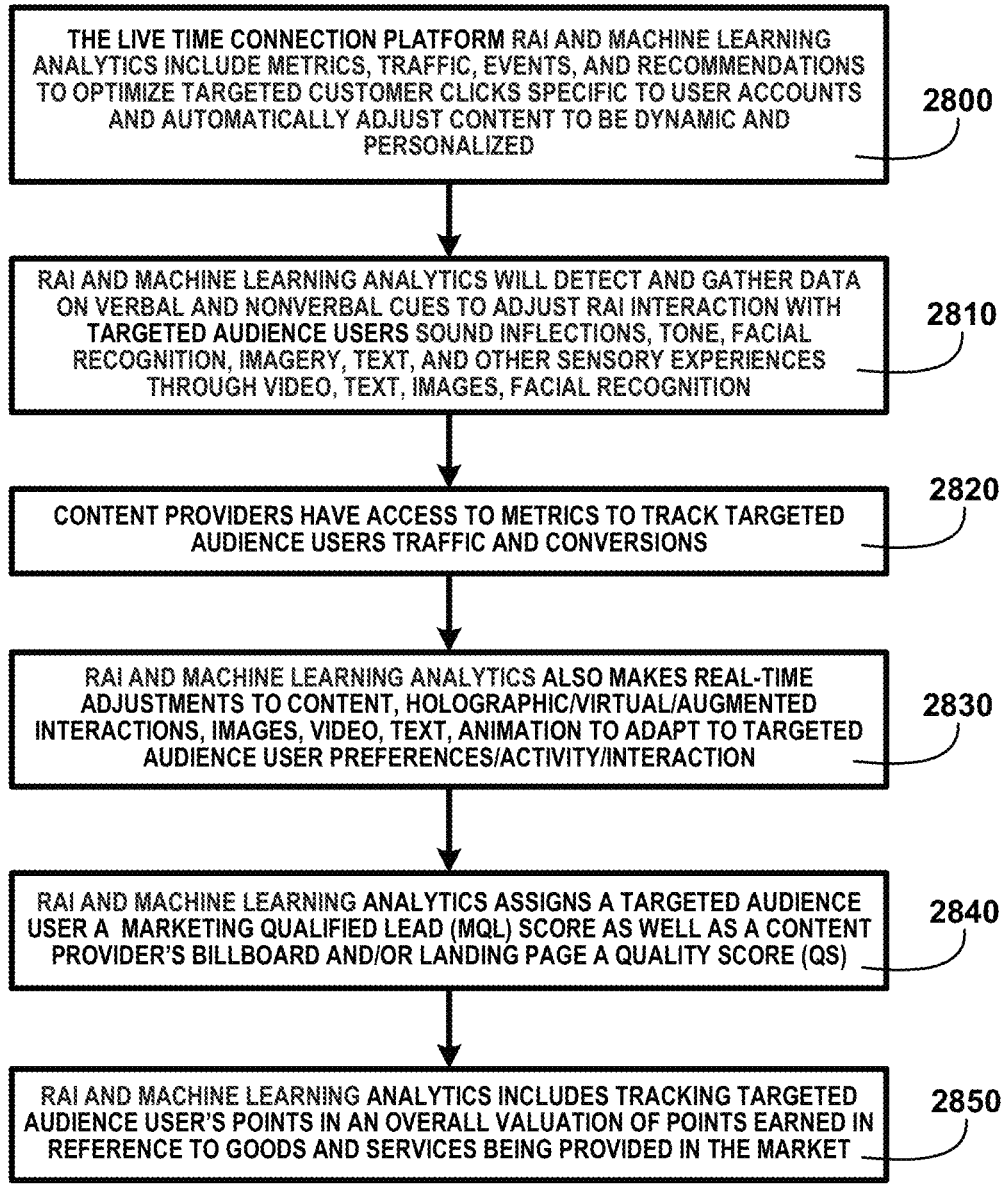
FIG. 28 shows a block diagram of an overview of RAI and machine learning analytics of one embodiment.

FIG. 28 shows a block diagram of an overview of RAI and machine learning analytics of one embodiment. FIG. 28 shows the live time remote server RAI and machine learning analytics including metrics, traffic, events, and recommendations to optimize targeted customer clicks specific to user accounts and automatically adjust content to be dynamic and personalized in real time 2800.

RAI and machine learning analytics will detect and gather data on verbal and nonverbal cues to adjust RAI interaction with targeted audience users' sound inflections, tone, facial recognition, imagery, text, and other sensory experiences through video, text, images, and facial recognition 2810. Content providers have access to metrics to track targeted audience users' traffic and conversions 2820.

RAI and machine learning analytics also make real-time adjustments to content, holographic/virtual/augmented interactions, images, video, text, and animation to adapt to targeted audience user preferences/activity/interaction 2830.

RAI and machine learning analytics assign a targeted audience user a marketing qualified lead (MQL) score as well as a content provider's billboard and/or landing page a quality score (QS) 2840. RAI and machine learning analytics include tracking targeted audience users' points in an overall valuation of points earned about goods and services being provided in the market 2850 of one embodiment.

Figure 29:
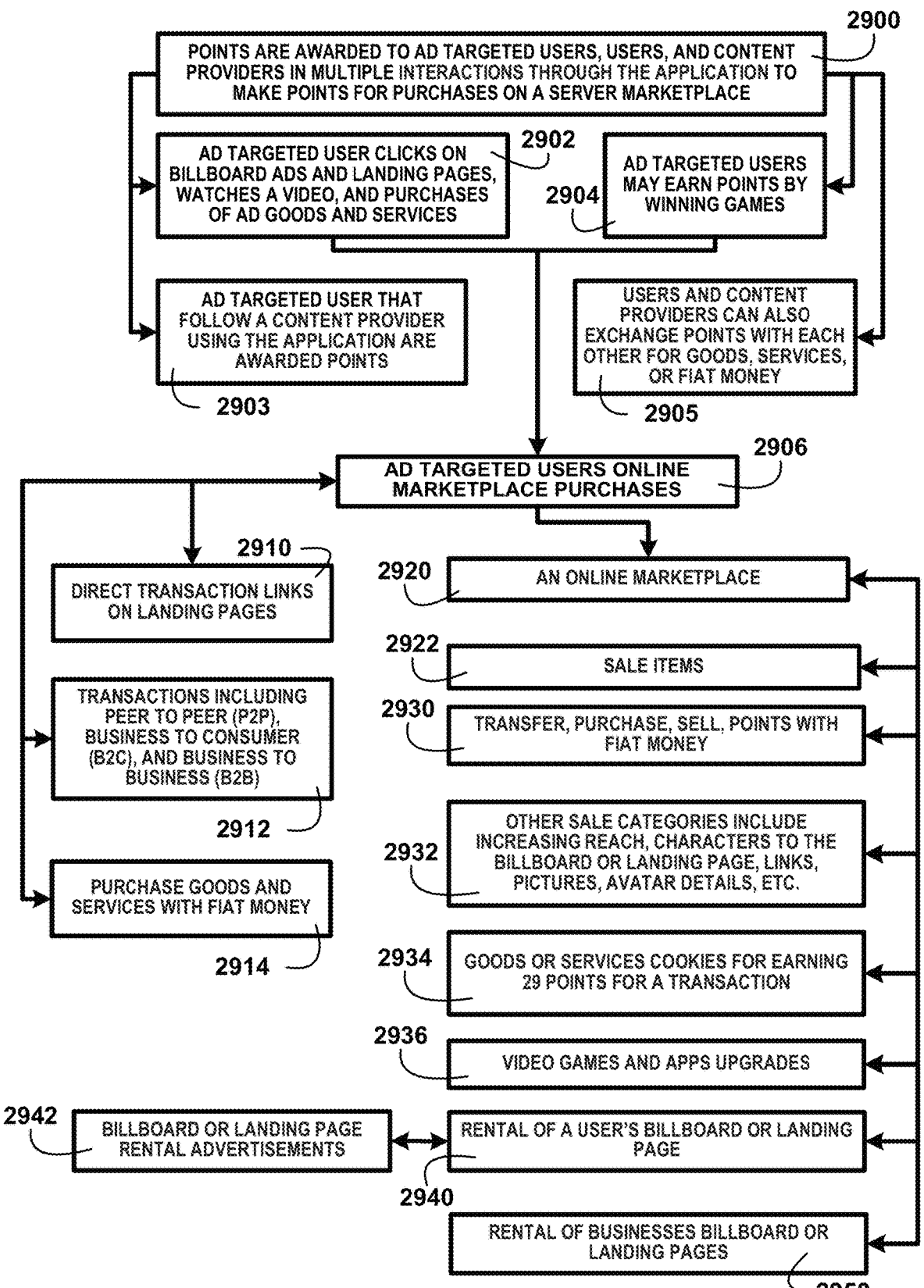
FIG. 29 shows a block diagram of an overview of an online marketplace of one embodiment.

FIG. 29 shows a block diagram of an overview of an online marketplace of one embodiment. FIG. 29 shows the live time remote server including an online marketplace where goods and services are offered and paid for with user-earned points. Points are awarded to ad targeted users, users, and content providers in multiple interactions through the application to make points for purchases on a server marketplace 2900. The advertisement targeted user who clicks on billboard advertisements and landing pages, watches a video, and purchases of advertisement goods and services 2902.

Ad targeted user that follow a content provider using the application are awarded points 2903. Ad-targeted users may earn points by winning games 2904. Users and content providers can also exchange points with each other for goods, services, or fiat money 2905. The ad-targeted users' online marketplace purchases 2906. Direct transaction links on landing pages 2910. Transactions include peer-to-peer (P2P), business-to-consumer (B2C), and business-to-business (B2B) 2912. Purchase goods and services with fiat money 2914.

Sale items 2922 include transfer, purchase, sell, and points with fiat money 2930. Other sale categories include increasing reach, characters to the billboard or landing page, links, pictures, avatar details, etc 2932, wherein reach includes communities that content providers build.

Goods or services cookies for earning 29 points for a transaction 2934. Video games and app upgrades 2936. Rent out a user's billboard or landing page 2940. Billboard or landing page rental advertisements 2942 that your billboard or landing page is available for rent, enabling another person to type their message in your billboard or landing page. Rental of businesses billboard or landing pages 2950 of one embodiment.

Figure 30:
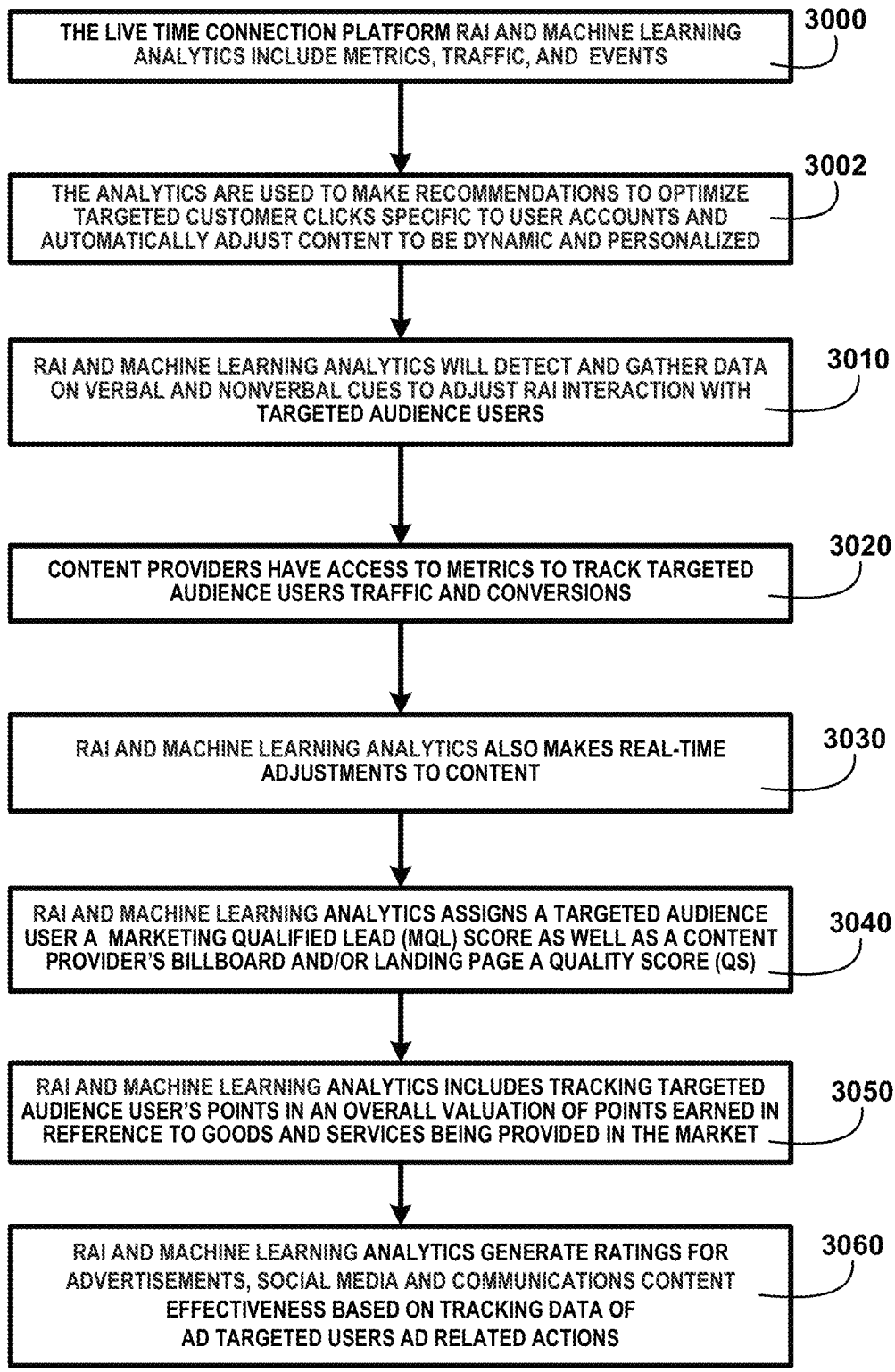
FIG. 30 shows a block diagram of an overview of RAI and machine learning analytics of one embodiment.

FIG. 30 shows a block diagram of an overview of RAI and machine learning analytics of one embodiment. FIG. 30 shows the live time remote server RAI and machine learning analytics including metrics, traffic, and events 3000. The analytics are used to make recommendations to optimize targeted customer clicks specific to user accounts and automatically adjust content to be dynamic and personalized 3002. RAI and machine learning analytics will detect and gather data on verbal and nonverbal cues to adjust RAI interaction with targeted audience users 3010. RAI and machine learning analytics will detect targeted user's sound inflections, tone, facial recognition, imagery, text, and other sensory experiences through video, text, images, and facial recognition.

Content providers have access to metrics to track targeted audience users' traffic and conversions 3020. RAI and machine learning analytics also make real-time adjustments to content 3030 including holographic/virtual/augmented interactions, images, video, text, and animation to adapt to targeted audience user preferences/activity/interaction.

RAI and machine learning analytics assign a targeted audience user a marketing qualified lead (MQL) score as well as a content provider's billboard and/or landing page a quality score (QS) 3040. RAI and machine learning analytics include tracking targeted audience users' points in an overall valuation of points earned in reference to goods and services being provided in the market 3050. RAI and machine learning analytics generate ratings for advertisements, social media and communications content effectiveness based on tracking data of ad-targeted users and ad-related actions 3060 of one embodiment.

Figure 31:
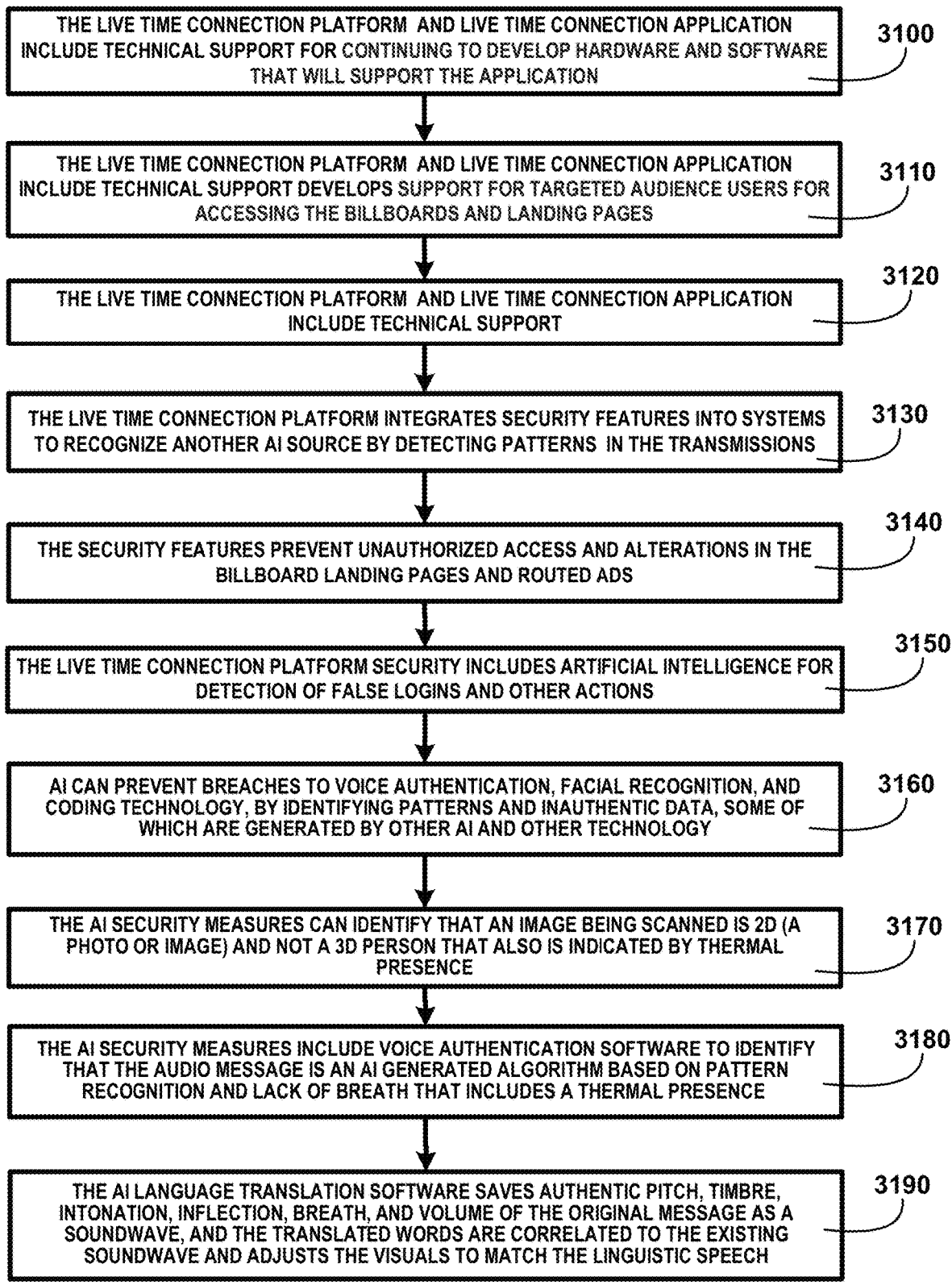
FIG. 31 shows a block diagram of an overview of RAI and machine learning technical support of one embodiment.

FIG. 31 shows a block diagram of an overview of RAI and machine learning technical support of one embodiment. FIG. 31 shows the live-time connection platform and live-time connection application including technical support for continuing to develop hardware and software that will support the application 3100. The live time remote server and live time connection application include technical support that develops support for targeted audience users for accessing the billboards and landing pages 3110.

The live time remote server and live time connection application include technical support 3120. Technical support includes language translation, vehicles for holographic images (aka. glasses, projectors, multi-sensory), and structures that give targeted audience users access options (aka. phones, waves, towers).

The live time remote server integrates security features into systems to recognize another AI source by detecting patterns in the transmissions 3130. The security features prevent unauthorized access and alterations in the billboard landing pages and routed advertisements 3140.

The live time remote server security includes artificial intelligence (AI) for detection of false logins and other actions 3150 with biometric identity detectors, such as facial recognition, voice recognition, iris recognition, fingerprint recognition and the like. AI can prevent breaches to voice authentication, facial recognition, and coding technology, by identifying patterns and inauthentic data, some of which are generated by other AI and other technology 3160. The AI security measures can identify that an image being scanned is 2D (a photo or image) and not a 3D person that also is indicated by thermal presence 3170. The AI security measures include voice authentication software to identify that an audio message is an AI generated algorithm based on pattern recognition and lack of breath that includes a thermal presence 3180. The message lacks including breath, clicks (a sound made in one's mouth between syllables), and background noise (which can never be fully removed even with the most sophisticated recording software. The AI language translation software saves authentic pitch, timbre, intonation, inflection, breath, and volume of the original message as a sound wave and the translated word are correlated to the existing sound wave and adjusts the visuals to match the linguistic speech 3190. The AI produced face appears naturally when verbalizing the translated words and has natural sounding spoken words of one embodiment.

Figure 32:
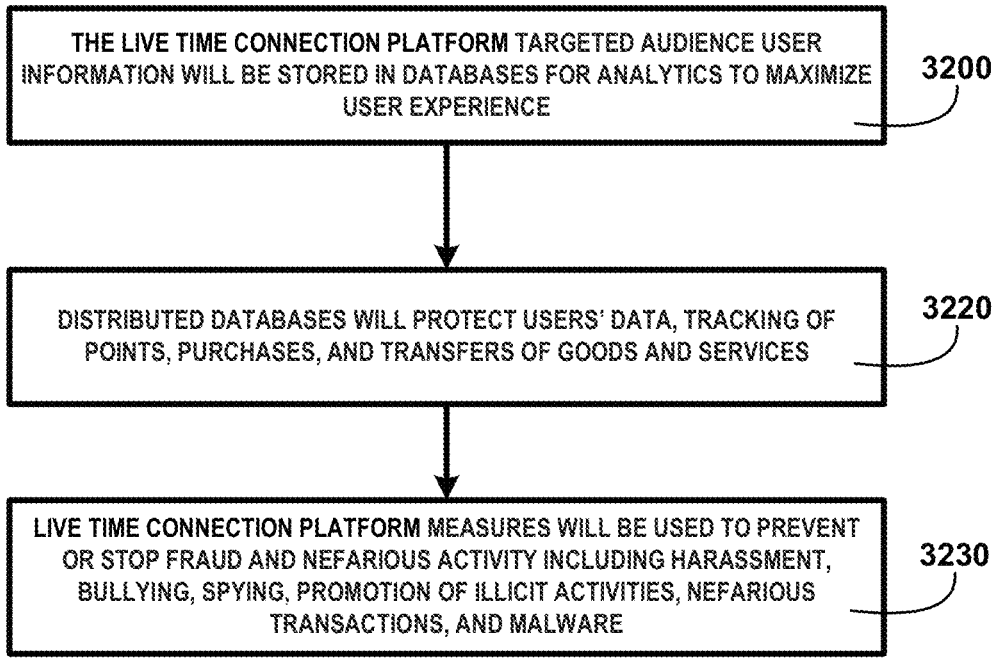
FIG. 32 shows a block diagram of an overview of RAI and machine learning technical support of one embodiment.

FIG. 32 shows a block diagram of an overview of RAI and machine learning technical support of one embodiment. FIG. 32 shows the live time remote server targeted audience user information will be stored in databases for analytics to maximize user experience 3200. Distributed databases will protect users' data, tracking points, purchases, and transfers of goods and services 3220.

Live time remote server measures will be used to prevent or stop fraud and nefarious activity including harassment, bullying, spying, promotion of illicit activities, nefarious transactions, and malware 3230.

The foregoing has described the principles, embodiments, and modes of operation of the present invention. However, the invention should not be construed as being limited to the particular embodiments discussed. The above-described embodiments should be regarded as illustrative rather than restrictive, and it should be appreciated that variations may be made in those embodiments by workers skilled in the art without departing from the scope of the present invention as defined by the following claims. All participants represented by their holographic avatar and viewing earn points and cryptocurrency for the time spent in the holographic AR how-to video 2180 of one embodiment.

What is claimed is:

1. An interactive system for creating personalized advertisements, comprising:
    a remote server having a responsive artificial intelligence processor;
    a client application operating on a mobile device and coupled to the remote server, wherein the client application includes a profile manager module configured to gather personalized preference information about each plural audience user, wherein the personalized preference information includes images, spoken language, facial expressions, detected emotions, nonverbal cues, demographics, online queries, and browser history of each audience user;
    an interactive admin application operating on a local computer coupled to the remote server and configured to allow a creator user to generate advertisements and social media communications content and a template with a main message of the advertisement;
    wherein the responsive artificial intelligence processor is configured to learn and compare the personalized preference information of each audience user to known analytics for automatically determining an appropriate audience user of the advertisements and social media communications content as personalized content;
    a graphical user interface coupled to the client application and configured to display the personalized content as selections to the appropriate audience user in real-time with real-time engagement-based incentives selected by the user;
    a tracking module coupled to the remote server and configured to track blockchain-based decentralized rewards when the appropriate audience user selects the displayed personalized content;
    a blockchain system coupled to the remote server configured to create a user cryptocurrency blockchain account to deposit and withdraw cryptocurrency earned by the user for the time spent using the client application; and
    an award module coupled to the remote server and configured to award the creator user and the appropriate audience user real-time engagement-based incentives with a user selectable predetermined award when the appropriate audience user selects the displayed personalized content.

2. The interactive system for creating personalized advertisements of claim 1, further comprising blockchain-based decentralized reward tracking purchases and transfers of goods and services between the creator user and each audience user.

3. The interactive system for creating personalized advertisements of claim 1, further comprising a responsive artificial intelligence facial recognition processor configured to discern between a non-live two-dimensional photo image of an audience user and a live image of the audience user.

4. The interactive system for creating personalized advertisements of claim 1, further comprising a responsive artificial intelligence voice authentication processor configured to discern between a non-live audio of a voice of the audience user and a voice of a live audio of the audience user.

5. The interactive system for creating personalized advertisements of claim 1, further comprising a responsive artificial intelligence language translation processor configured to recognize the attenuations and accents of the audience user and convert a live audio voice of the audience user into a selected translated language audio in real-time, wherein the attenuations and accents of the audience user are used in the translated language audio.

6. The interactive system for creating personalized advertisements of claim 1, further comprising a gaming ad module configured to send interactive single and multi-player games to the audience users based on the personalized preference information of each audience user.

7. The interactive system for creating personalized advertisements of claim 6, wherein audience users are placed together in the multi-player games based on the personalized preference information and wherein each audience user is awarded points for interacting with other audience users and an audience user selects the displayed personalized content.

8. An interactive system for creating personalized advertisements, comprising:
    a remote server having a responsive artificial intelligence processor;

a client application operating on a digital device and wirelessly coupled to the remote server, wherein the client application includes a profile manager module configured to gather personalized preference information about each plural audience user, wherein the personalized preference information includes images, spoken language, facial expressions, detected emotions, nonverbal cues, demographics, online queries, and browser history of each audience user;

an interactive admin application operating on a local computer coupled to the remote server and configured to allow a creator user to generate advertisements and social media communications content and a template with a main message of the advertisement;

wherein the responsive artificial intelligence processor is configured to learn and compare the personalized preference information of each audience user to known analytics for automatically determining an appropriate audience user of the advertisements and social media communications content as personalized content;

a security module operating on the remove server and coupled to the responsive artificial intelligence processor and configured to detect false logins with biometric identify detection;

a graphical user interface coupled to the client application and configured to display the personalized content as selections to the appropriate audience user in real-time with real-time engagement-based incentives selected by the user;

a tracking module coupled to the remote server and configured to track blockchain-based decentralized rewards selected by the user when the appropriate audience user selects the displayed personalized content;

a blockchain system coupled to the remote server configured to create a user cryptocurrency blockchain account to deposit and withdraw cryptocurrency earned by the user for the time spent using the client application; and an award module coupled to the remote server and configured to award the creator user and the appropriate audience user real-time engagement-based incentives with a user selectable predetermined award when the appropriate audience user selects the displayed personalized content.

9. The interactive system for creating personalized advertisements of claim 8, further comprising blockchain-based decentralized reward tracking purchases and transfers of goods and services between the creator user and each audience user.

10. The interactive system for creating personalized advertisements of claim 8, further comprising a responsive artificial intelligence facial recognition processor configured to discern between a non-live two-dimensional photo image of an audience user and a live image of the audience user.

11. The interactive system for creating personalized advertisements of claim 8, further comprising a responsive artificial intelligence voice authentication processor configured to discern between a non-live audio of a voice of the audience user and a voice of a live audio of the audience user.

12. The interactive system for creating personalized advertisements of claim 8, further comprising a responsive artificial intelligence language translation processor configured to recognize the attenuations and accents of the audience user and convert a live audio voice of the audience user into a selected translated language audio in real-time, wherein the attenuations and accents of the audience user are used in the translated language audio.

13. The interactive system for creating personalized advertisements of claim 8, further comprising a gaming ad module configured to send interactive single and multi-player games to the audience users based on the personalized preference information of each audience user.

14. The interactive system for creating personalized advertisements of claim 8, wherein audience users are placed together in the multi-player games based on the personalized preference information and wherein each audience user is awarded points for interacting with other audience users and an audience user selects the displayed personalized content.

15. An interactive system for creating personalized advertisements, comprising:

a remote server having a responsive artificial intelligence processor;

a client application operating on a digital device and wirelessly coupled to the remote server, wherein the client application includes a profile manager module configured to gather personalized preference information about each plural audience user, wherein the personalized preference information includes images, spoken language, facial expressions, detected emotions, nonverbal cues, demographics, online queries, and browser history of each audience user;

an interactive admin application operating on a local computer coupled to the remote server and configured to allow a creator user to generate advertisements and social media communications content and a template with a main message of the advertisement;

wherein the responsive artificial intelligence processor is configured to learn and compare the personalized preference information of each audience user to known analytics for automatically determining an appropriate audience user of the advertisements and social media communications content as personalized content;

a security module operating on the remove server and coupled to the responsive artificial intelligence processor and configured to detect false logins with biometric identify detection;

a graphical user interface coupled to the client application and configured to display the personalized content as selections to the appropriate audience user in real-time with real-time engagement-based incentives selected by the user;

a tracking module coupled to the remote server and configured to track blockchain-based decentralized reward tracking when the appropriate audience user selects the displayed personalized content;

a blockchain system coupled to the remote server configured to create a user cryptocurrency blockchain account to deposit and withdraw cryptocurrency earned by the user for the time spent using the client application; and a gaming ad module configured to send interactive single and multi-player games to the audience users based on the personalized preference information of each audience user, wherein audience users are placed together in the multi-player games based on the personalized preference information; and an award module coupled to the remote server and configured to award the creator user and the appropriate audience user with real-time engagement-based incentives with a user selectable predetermined award when the appropriate audience user selects the displayed personalized content and interacts with games with other audience users.

16. The interactive system for creating personalized advertisements of claim 15, further comprising blockchain-based decentralized reward tracking purchases and transfers of goods and services between the creator user and each audience user.

17. The interactive system for creating personalized advertisements of claim 15, further comprising a responsive artificial intelligence facial recognition processor configured to discern between a non-live two-dimensional photo image of an audience user and a live image of the audience user.

18. The interactive system for creating personalized advertisements of claim 15, further comprising a responsive artificial intelligence voice authentication processor configured to discern between a non-live audio of a voice of the audience user and a voice of a live audio of the audience user.

19. The interactive system for creating personalized advertisements of claim 15, further comprising a responsive artificial intelligence language translation processor configured to recognize the attenuations and accents of the audience user.

20. The interactive system for creating personalized advertisements of claim 19, wherein the responsive artificial intelligence language translation processor if further configured to convert a live audio voice of the audience user into a selected translated language audio in real-time, wherein the attenuations and accents of the audience user are used in the translated language audio.

* * * * *